(12) United States Patent
Toda et al.

(10) Patent No.: US 10,182,226 B2
(45) Date of Patent: Jan. 15, 2019

(54) DISPLAY UNIT, DISPLAY SYSTEM, AND DISPLAY METHOD

(71) Applicant: Keisuke Toda, Tokyo (JP)

(72) Inventors: Keisuke Toda, Tokyo (JP); Hiroki Asada, Tokyo (JP); Yoji Narisawa, Sagamihara (JP)

(73) Assignee: Keisuke Toda, Tokyo (JP)

( * ) Notice: Subject to any disclaimer, the term of this patent is extended or adjusted under 35 U.S.C. 154(b) by 345 days.

(21) Appl. No.: 15/164,397

(22) Filed: May 25, 2016

(65) Prior Publication Data

US 2016/0269721 A1 Sep. 15, 2016

Related U.S. Application Data

(63) Continuation of application No. PCT/JP2014/081091, filed on Nov. 25, 2014.

(30) Foreign Application Priority Data

Nov. 26, 2013 (JP) .................................. 2013-244226

(51) Int. Cl.
*H04N 13/04* (2006.01)
*H04N 13/341* (2018.01)
(Continued)

(52) U.S. Cl.
CPC ......... *H04N 13/341* (2018.05); *H04N 13/305* (2018.05); *H04N 13/31* (2018.05); *H04N 13/324* (2018.05)

(58) Field of Classification Search
CPC ..... G09G 2320/062; G09G 2310/0232; G09G 3/342; G09G 3/3648; G09G 2320/0626;
(Continued)

(56) References Cited

U.S. PATENT DOCUMENTS 6,157,382 A 12/2000 Ohshima et al.
8,207,931 B2 * 6/2012 Zhang .................. G09G 3/3426
345/102
(Continued)

FOREIGN PATENT DOCUMENTS

JP H08160340 A 6/1996
JP H11090719 A 4/1998
(Continued)

OTHER PUBLICATIONS

Office Action dated Jan. 25, 2018 in JP Application No. 2013-244226.
(Continued)

*Primary Examiner* — Nathnael Aynalem
(74) *Attorney, Agent, or Firm* — Panitch Schwarze Belisario & Nadel LLP

(57) ABSTRACT

Provided is a display unit that includes a first display section and a second display section. The first display section is configured to perform picture display and transmissive display. The picture display is based on a picture signal and performed on pixels in a partial region corresponding to a partial image part in a frame image represented by the picture signal, and the transmissive display is performed on pixels in a region other than the partial region. The second display section is provided behind the first display section, and configured to perform dummy display and transmissive display. The dummy display is performed on pixels in the partial region to display a dummy image that is one of a uniform image and a non-uniform image, and the transmissive display is performed on pixels in the region other than the partial region.

18 Claims, 15 Drawing Sheets

(51) Int. Cl.
*H04N 13/305* (2018.01)
*H04N 13/31* (2018.01)
*H04N 13/324* (2018.01)

(58) Field of Classification Search
CPC ............. G09G 3/36; G09G 2320/0285; G09G 2360/16; G09G 3/3208; G09G 3/3406; G09G 3/3607; G09G 2300/0456; H04N 13/341
USPC ......................................... 345/102, 589, 100
See application file for complete search history.

(56) References Cited

U.S. PATENT DOCUMENTS

| | | | |
|---|---|---|---|
| 2003/0169247 A1* | 9/2003 | Kawabe | G09G 3/342 345/204 |
| 2005/0140641 A1* | 6/2005 | Kim | G09G 3/3406 345/102 |
| 2006/0061538 A1* | 3/2006 | Dispoto | G09G 3/3426 345/102 |
| 2006/0209002 A1* | 9/2006 | Uchikawa | G02F 1/1336 345/102 |
| 2008/0150853 A1* | 6/2008 | Peng | G09G 3/3426 345/87 |
| 2011/0037785 A1 | 2/2011 | Shiomi | |
| 2011/0115700 A1* | 5/2011 | Yang | G09G 3/3406 345/156 |
| 2011/0292040 A1* | 12/2011 | Chiba | G02B 27/2264 345/419 |
| 2012/0176570 A1 | 7/2012 | Yamazaki et al. | |
| 2012/0194512 A1* | 8/2012 | Kim | G06T 15/503 345/419 |
| 2012/0249610 A1* | 10/2012 | Katagami | G09G 3/3426 345/690 |
| 2012/0249617 A1* | 10/2012 | Ikawa | H04N 5/58 345/691 |
| 2012/0268365 A1* | 10/2012 | Lee | G09G 3/3406 345/156 |
| 2013/0120475 A1* | 5/2013 | Katsu | G09G 3/3426 345/690 |
| 2014/0028741 A1* | 1/2014 | Nakahata | G02B 27/2264 345/694 |

FOREIGN PATENT DOCUMENTS

| | | |
|---|---|---|
| JP | H110161802 A | 6/1998 |
| JP | 2002-90782 | 3/2002 |
| JP | 2002-296375 | 10/2002 |
| JP | 2005-208125 A | 8/2005 |
| JP | 2006-3821 | 1/2006 |
| JP | 2007108290 A | 4/2007 |
| JP | 2008-83510 | 4/2008 |
| JP | 2011034996 A | 2/2011 |
| JP | 2011259354 A | 12/2011 |
| JP | 2012155320 A | 8/2012 |
| JP | 2013-41099 A | 2/2013 |
| JP | 2013109056 A | 6/2013 |
| JP | 2013-142804 A | 7/2013 |
| JP | 2013210643 A | 10/2013 |
| WO | 2009157224 A1 | 12/2009 |

OTHER PUBLICATIONS

"Kankyou Chouwagata Shinzairyou Series, Display Zairyou", The Ceramic Society of Japan, Kikkan Kogyo Shimbun Ltd., Jan. 30, 2013, pp. 144-151.
Shimbun, "Transparent Conducrive Material", The Ceramic Society of Japan, Nikkan Kogyo Shimbub Ltd., pp. 144-151, Jan. 30, 2013.
International Search Report dated Feb. 24, 2015 in International Application No. PCT/JP2014/081091.

* cited by examiner

DISPLAY UNIT, DISPLAY SYSTEM, AND DISPLAY METHOD

CROSS REFERENCE TO RELATED APPLICATIONS

This is a continuation of International Application No. PCT/JP2014/81091, filed Nov. 25, 2014, which claims the benefit of Japanese Priority Patent Application JP2013-244226, filed Nov. 26, 2013, the entire contents of both of which are incorporated herein by reference.

BACKGROUND

The invention relates to a display unit and a display system that display an image, and to a display method used for the display unit and the display system.

A so-called see-through display has been developed in recent years in which a display section is configured by a transparent material. Unlike a regular display unit, a display unit having such a transmissive display section makes it possible to display characters and images on the actual landscape in an overlaid fashion. The display unit is expected to be used in various applications including, without limitation, augmented reality (AR).

The currently-developed transmissive display section may include a device such as, but not limited to, an organic electroluminescence (EL) device, an inorganic EL device, and a liquid crystal device. For example, Japanese Unexamined Patent Application Publication No. 2011-34996 discloses a display unit in which the organic EL device is used to configure the transmissive display section. A transparent electrically-conductive material usable for the organic EL device is disclosed, for example, in "Kankyou Chouwagata Shinzairyou Series, Display Zairyou (translated as "environment-conscious new material series, display material")", edited by The Ceramic Society of Japan, Nikkan Kogyo Shimbun Ltd., Jan. 30, 2013, pp. 144-151.

SUMMARY

A display unit having a transmissive display section may involve a decrease in visibility depending on, for example but not limited to, a display content and an environment under which the display unit is used. For example, when a dark image is displayed under a bright environment on a transmissive display section that may be configured by an organic EL device, a dark part in the image becomes transmissive. In this case, a user may see the landscape under the bright environment, in a region where the dark image is supposed to be displayed. Further, for example, when a bright image is displayed under a dark environment on a transmissive display section that may be configured by a liquid crystal device, a bright part in the image becomes transmissive. In this case, the user may see the landscape under the dark environment, in a region where the bright image is supposed to be displayed. As will be appreciated from the foregoing, the display unit having the transmissive display section may prevent a user from seeing an image supposed to be displayed by the display unit, depending on a display content and an environment under which the display unit is used. It is therefore desirable that the display unit having the transmissive display section achieve high visibility irrespective of the display content and the environment under which the display unit is used.

It is desirable to provide a display unit, a display system, and a display method that make it possible to increase visibility irrespective of a display content and an environment under which the display unit is used.

A display unit according to an illustrative embodiment of the invention includes: a first display section configured to perform picture display and transmissive display, in which the picture display is based on a picture signal and performed on pixels in a partial region corresponding to a partial image part in a frame image represented by the picture signal, and the transmissive display is performed on pixels in a region other than the partial region; and a second display section provided behind the first display section, and configured to perform dummy display and transmissive display, in which the dummy display is performed on pixels in the partial region to display a dummy image that is one of a uniform image and a non-uniform image, and the transmissive display is performed on pixels in the region other than the partial region.

As used herein, the wording "picture display based on a picture signal" refers not only to display, as it is, of the partial image part indicated by the picture signal, but also to display of the partial image part by slightly increasing a light transmission level. The term "transmissive display" is not limited to completely transparent display, and encompasses display in which the light transmission level is slightly decreased. The term "dummy display" is not limited to completely non-transparent display, and encompasses display in which the light transmission level is slightly increased.

A display system according to an illustrative embodiment of the invention is provided with a transmission picture signal generating unit and a display unit, in which the transmission picture signal generating unit is configured to generate, based on a picture signal, a transmission picture signal that represents a light transmission level of each pixel. The display unit includes: a first display section configured to perform picture display and transmissive display, in which the picture display is based on the picture signal and performed on pixels in a partial region corresponding to a partial image part in a frame image represented by the picture signal, and the transmissive display is based on the transmission picture signal and performed on pixels in a region other than the partial region; and a second display section provided behind the first display section, and configured to perform dummy display and transmissive display, in which the dummy display is performed on pixels in the partial region to display a dummy image that is one of a uniform image and a non-uniform image, and the transmissive display is based on the transmission picture signal and performed on pixels in the region other than the partial region.

A display method according to an illustrative embodiment of the invention includes: generating, based on a picture signal, a transmission picture signal that represents a light transmission level of each pixel; performing, in a first display section, picture display and transmissive display, in which the picture display is based on the picture signal and performed on pixels in a partial region corresponding to a partial image part in a frame image represented by the picture signal, and the transmissive display is based on the transmission picture signal and performed on pixels in a region other than the partial region; and performing, in a second display section provided behind the first display section, dummy display and transmissive display, in which the dummy display is performed on pixels in the partial region to display a dummy image that is one of a uniform image and a non-uniform image, and the transmissive display is based on the transmission picture signal and performed on pixels in the region other than the partial region.

In the display unit, the display system, and the display method according to the respective illustrative embodiments of the invention, the first display section and the second display section each perform the display. The first display section performs the picture display that is based on the picture signal and performed on the pixels in the partial region that corresponds to the partial image part, and performs the transmissive display that is performed on the pixels in any region other than the partial region. The second display section performs the dummy display that is performed on the pixels in the partial region to display the dummy image that is one of the uniform image and the non-uniform image, and performs the transmissive display that is performed on the pixels in the region other than the partial region.

Advantageously, the first display section and the second display section each may perform the transmissive display, based on a transmission picture signal that represents a pixel-based light transmission level.

Advantageously, the transmission picture signal may include the light transmission level in the partial region and the light transmission level in the region other than the partial region, the first display section may perform the picture display, based on the light transmission level in the partial region, and perform the transmissive display, based on the light transmission level in the region other than the partial region, the second display section may perform the dummy display, based on the light transmission level in the partial region, and perform the transmissive display, based on the light transmission level in the region other than the partial region, and an average of the light transmission level represented by the transmission picture signal in the partial region may be lower than an average of the light transmission level represented by the transmission picture signal in the region other than the partial region.

Advantageously, the light transmission level may be non-uniform in the region other than the partial region, or may be uniform in the region other than the partial region.

Advantageously, a filter section may be further included that may be configured to perform a filtering process on the transmission picture signal. The first display section and the second display section each may perform the transmissive display, based on the transmission picture signal having been subjected to the filtering process.

Advantageously, an input section may be further included that may be configured to receive the picture signal and the transmission picture signal that are multiplexed with each other.

Advantageously, a first input section may be further included that may be configured to receive the picture signal, and a second input section may be further included that may be configured to receive the transmission picture signal.

Advantageously, the second input section may include a network interface, and the transmission picture signal may be supplied via the Internet.

Advantageously, a transmission picture signal generating section may be further included that may be configured to generate the transmission picture signal, based on the picture signal.

Advantageously, the first display section may include a light-emission display section, and the second display section may include a non-light-emission display section.

Advantageously, the first display section may include a non-light-emission display section, and the second display section may include a light-emission display section.

Advantageously, the first display section may include a non-light-emission display section, and the second display section may include a selective-reflection display section. For example, the selective-reflection display section may allow for a pixel-based reflection of light that has entered from a display screen.

Advantageously, the first display section and the second display section may be provided integrally.

Advantageously, a third display section may be included that may be provided behind the second display section, and configured to perform picture display and transmissive display, in which the picture display may be based on the picture signal and performed on pixels in the partial region, and the transmissive display may be performed on pixels in the region other than the partial region.

Advantageously, a perspective image separating section may be further included, the first display section may display a plurality of perspective images, and the perspective image separating section may be configured to allow a user to view the perspective images separately.

Advantageously, the first display section may space-divisionally display the perspective images, and the perspective image separating section may include one of a parallax barrier and a lenticular lens.

Advantageously, a controller may further included, the first display section may time-divisionally display the perspective images, and the controller may be configured to send a control signal to shutter eyeglasses having a left eye shutter and a right eye shutter, in which the left eye shutter and the right eye shutter each may be operable to perform light transmission and light blocking in synchronization with display operation of the first display section.

The display unit, the display system, and the display method according to the respective illustrative embodiments of the invention include the first display section and the second display section. Hence, it is possible to increase visibility irrespective of a display content and an environment under which the display unit is used.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
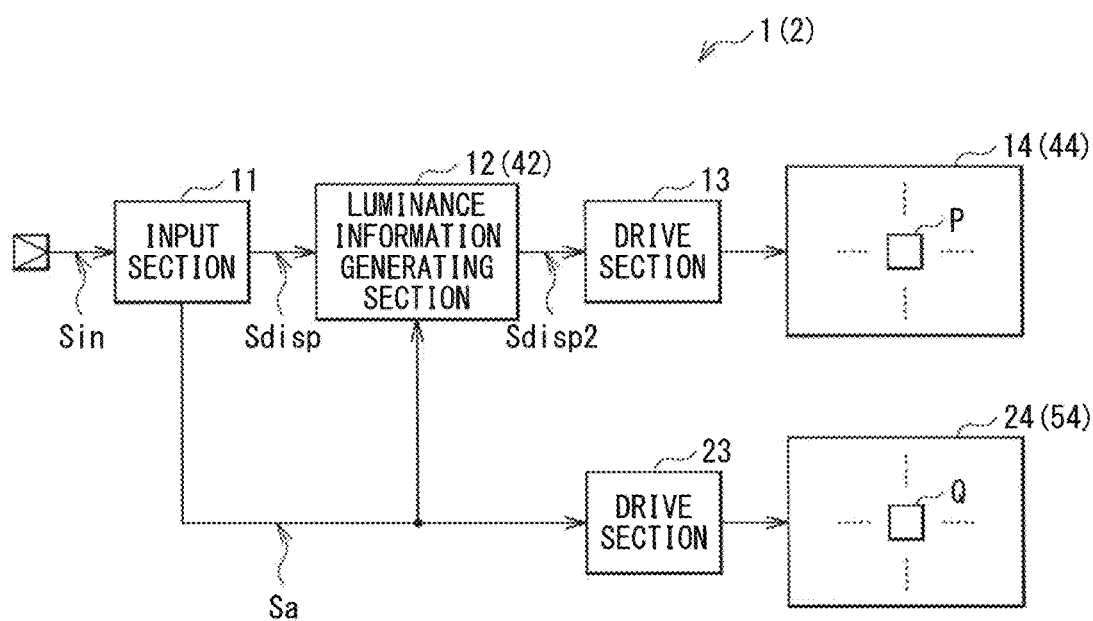
FIG. 1 is a block diagram illustrating an example of a configuration of a display unit according to a first example embodiment of the invention.

In the following, some example embodiments of the technology will be described in detail, in the following order, with reference to the accompanying drawings.
1. First Example Embodiment
2. Second Example Embodiment
3. Application Examples
[1. First Example Embodiment]
[Configuration Example]
FIG. 1 illustrates an example of a configuration of a display unit according to a first example embodiment. A display unit 1 may be a so-called see-through display in which a display section is configured by a transparent material and makes it possible to display characters and images on the actual landscape in an overlaid fashion. Note that a display method according to any embodiment of the invention is embodied by example embodiments of the invention and is thus described together herein.

The display unit 1 may include an input section 11, a luminance information generating section 12, a drive section 13, a display section 14, a drive section 23, and a display section 24. The display unit 1 may perform display, based on a signal Sin in which a picture signal Sdisp and a transmission picture signal Sa are multiplexed with each other. The picture signal Sdisp may include red (R) luminance information IR, green (G) luminance information IG, and blue (B) luminance information IB. In the example embodiment, the luminance information IR, the luminance information IG, and the luminance information IB each may indicate a value that is in a range from "0" (zero) to "1" (one). The value "0" may indicate a minimum luminance, i.e., black display, whereas the value "1" may indicate a maximum luminance. The transmission picture signal Sa may include pieces of transmission level information $\alpha$ each indicating a light transmission level of a corresponding pixel. In the example embodiment, the pieces of transmission level information $\alpha$ each may indicate a value that is in a range from "0" to "1". The value "0" may indicate non-transmission of light, whereas the value "1" may indicate transmission of light. In the example embodiment, as will be described later in greater detail, the value of the transmission level information $\alpha$ may be so set as to cause the light transmission level to be low in a region that corresponds to a certain image part A in a frame image F, and as to cause the light transmission level to be high in a region other than the region that corresponds to the certain image part A. The frame image F is represented by the picture signal Sdisp.

The input section 11 may be an input interface that receives the signal Sin. The input section 11 may serve to separate the picture signal Sdisp and the transmission picture signal Sa from the signal Sin. The input section 11 may also serve to supply the luminance information generating section 12 with the picture signal Sdisp, and supply the luminance information generating section 12 and the drive section 23 with the transmission picture signal Sa. The input section 11 may be configured by hardware, or may include a processor and a part or all of the functions of the processor may be configured by software.

The luminance information generating section 12 may generate a picture signal Sdisp2, based on the picture signal Sdisp and the transmission picture signal Sa. More specifically, the luminance information generating section 12 may generate luminance information IR2, luminance information IG2, and luminance information IB2, based on the luminance information IR, the luminance information IG, and the luminance information IB on a certain pixel and based on the transmission level information $\alpha$ on that pixel. Here, the luminance information generating section 12 may utilize the luminance information IR, the luminance information IG, and the luminance information IB as they are as the luminance information IR2, the luminance information IG2, and the luminance information IB2 for any pixel in which the value of the transmission level information $\alpha$ is sufficiently low (i.e., a pixel in which the light transmission level is sufficiently low). For any pixel in which the value of the transmission level information $\alpha$ is high (i.e., a pixel in which the light transmission level is high), the luminance information generating section 12 may decrease the values of the luminance information IR, the luminance information IG, and the luminance information IB to thereby generate the luminance information IR2, the luminance information IG2, and the luminance information IB2. In other words, in view of the display section 14 which may be both a light-emission display device and a light transmissive device as will be described later in greater detail, the display section 14 may decrease the values of the respective pieces of luminance information for any pixel in which the value of the transmission level information α is high (i.e., the pixel in which the light transmission level is high) to thereby increase the light transmission level of a later-described pixel P of the display section 14. The luminance information generating section 12 may output the thus-generated luminance information IR2, luminance information IG2, and luminance information IB2 as the picture signal Sdisp2. The luminance information generating section 12 may be configured by hardware, or may include a processor and a part or all of the functions of the processor may be configured by software.

The drive section 13 may drive the display section 14, based on the picture signal Sdisp2. More specifically, the drive section 13 may drive, based on the picture signal Sdisp2, each of the later-described pixels P of the display section 14 by means of line-sequential scanning to cause the display section 14 to perform display that is based on the picture signal Sdisp2.

The display section 14 may be a light transmissive display section in which a display region is transparent, and may display, based on the drive performed by the drive section 13, an image by means of light emission. Such a light-emission display section 14 may include an organic EL device, an inorganic EL device, or any other device that allows for the light emission. The display section 14 may be so disposed in front of the display section 24 as to be overlapped with the display section 24 as will be described later in greater detail.

The display section 14 may have a configuration in which the pixels P are arranged in matrix. In the example embodiment, the pixels P each may include an unillustrated red (R) sub-pixel PsubR, an unillustrated green (G) sub-pixel PsubG, and an unillustrated blue (B) sub-pixel PsubB. The sub-pixel PsubR, the sub-pixel PsubG, and the sub-pixel PsubB each may emit light at a luminance that corresponds to corresponding one of the luminance information IR2, the luminance information IG2, and the luminance information IB2, thereby allowing the display section 14 to display an image.

The drive section 23 may drive the display section 24, based on the transmission picture signal Sa. More specifically, the drive section 23 may drive, based on the transmission picture signal Sa, each of later-described pixels Q of the display section 24 by means of line-sequential scanning to cause the display section 24 to perform display that is based on the transmission picture signal Sa.

The display section 24 may be a light transmissive display section in which a display region is transparent, and may set the light transmission levels, based on the drive performed by the drive section 23. Such a display section 24 may include, without limitation, a liquid crystal device. The display section 24 may be so disposed behind the display section 14 as to be overlapped with the display section 14 as will be described later in greater detail. The display section 24 may have a configuration in which the pixels Q are arranged in matrix. The pixels Q may be so configured that the respective light transmission levels are settable, based on the pieces of transmission level information α. Preferably, the pixels Q each may have a dark color, such as black without limitation, when the light transmission level is sufficiently low. In other words, each of the pixels Q may involve the higher light transmission level as the value of the transmission level information α becomes higher, and may involve the lower light transmission level as the value of the transmission level information α becomes lower to thus have a darker color such as, but not limited to, black.

Figure 2:
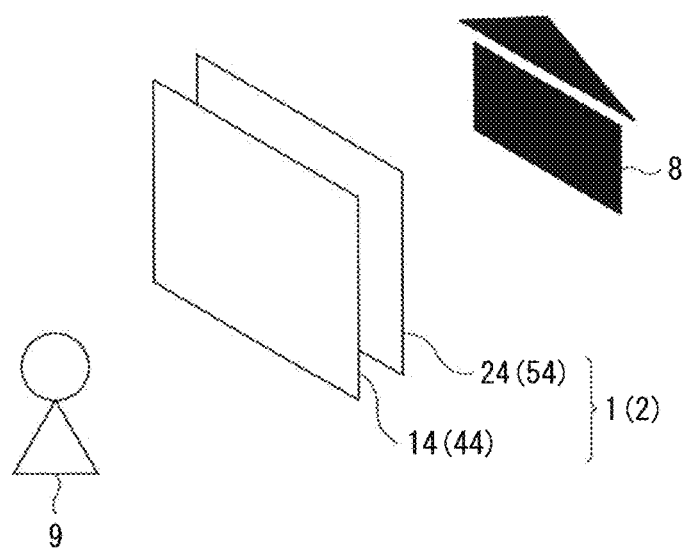
FIG. 2 describes an example of a configuration of the display unit illustrated in FIG. 1.

FIG. 2 illustrates a layout of the display section 14 and the display section 24. The display section 14 and the display section 24 may be so disposed as to be overlapped with each other. More specifically, the display section 14 may be disposed on the display screen side from which a user 9 sees, and the display section 24 may be disposed at the back of the display section 14. As will be appreciated from the foregoing, the display section 14 and the display section 24 may be provided separately from each other and so disposed as to be overlapped with each other in the display unit 1. In the example embodiment, the pixels Q in the display section 24 each may correspond to corresponding one of the pixels P in the display section 14. The arrangement of the pixels Q and P, however, is not limited thereto. In an alternative example embodiment, the pixels Q in the display section 24 each may correspond to a corresponding plurality of pixels P in the display section 14.

With this example configuration, the display unit 1 makes it possible to display characters and images on the landscape in an overlaid fashion in the display regions of the respective display sections 14 and 24. FIG. 2 illustrates an example where the landscape includes a house 8. Upon performing the display, the display unit 1 may set the luminance of each of the pixels P in the display section 14 and the light transmission level of each of the pixels Q in the display section 24, both based on the pieces of transmission level information α. Accordingly, it is possible for the display unit 1 to increase visibility irrespective of a display content and an environment under which the display unit 1 is used.

In one embodiment of the invention, the display section 14 corresponds to a "first display section" without limitation. The display section 24 corresponds to a "second display section" in one embodiment of the invention without limitation. The picture signal Sdisp corresponds to a "picture signal" in one embodiment of the invention without limitation.

[Operation and Workings]

A description is given next of an operation and workings of the display unit 1 according to the example embodiment.

[Outline of Overall Operation]

First, a description is given of an outline of an overall operation of the display unit 1 with reference to FIG. 1. The input section 11 may separate the picture signal Sdisp and the transmission picture signal Sa from the signal Sin. The input section 11 may further supply the luminance information generating section 12 with the picture signal Sdisp, and supply the luminance information generating section 12 and the drive section 23 with the transmission picture signal Sa. The luminance information generating section 12 may generate the picture signal Sdisp2, based on the picture signal Sdisp and the transmission picture signal Sa. The drive section 13 may drive the display section 14, based on the picture signal Sdisp2. The display section 14 may display, based on the drive performed by the drive section 13, an image by means of the light emission. The drive section 23 may drive the display section 24, based on the transmission picture signal Sa. The display section 24 may set the light transmission level for each of the pixels Q, based on the drive performed by the drive section 23.

[Detailed Operation]

The display unit 1 may perform the display, based on the signal Sin in which the picture signal Sdisp and the transmission picture signal Sa are multiplexed with each other. Upon performing the display, the display unit 1 may set the luminance of each of the pixels P in the display section 14 and the light transmission level of each of the pixels Q in the display section 24, both based on the pieces of transmission level information α. In the following, a description is given of a detailed operation of the display unit 1.

Figure 3:
FIG. 3 describes an example of a frame image.

FIG. 3 illustrates an example of the frame image F in which a zebra is located at a part near the center, and a part other than the part at which the zebra is located is indicated in black color. The frame image F is represented by the picture signal Sdisp. In the following example, the part at which the zebra is located in the frame image F is described as an image part A.

Figure 4:
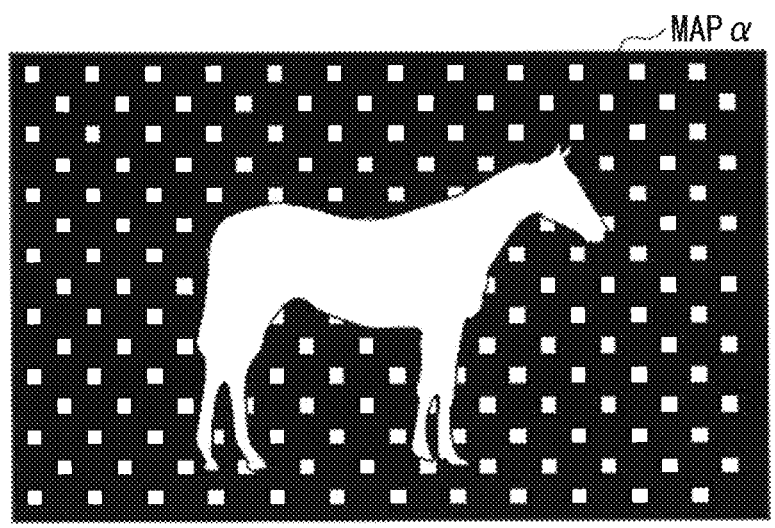
FIG. 4 describes an example of a transmission picture signal.

FIG. 4 illustrates an example of map data MAPα of the pieces of transmission level information α that are represented by the transmission picture signal Sa. In FIG. 4, each part illustrated in white color denotes that the value of the transmission level information α is "0", i.e., non-transmission of light, whereas each part illustrated in black color denotes that the value of the transmission level information α is "1", i.e., transmission of light. In the example embodiment, the values of the respective pieces of transmission level information α in a region that corresponds to the image part A are each set to "0", i.e., non-transmission of light. Further, the values "1" and "0" of the pieces of transmission level information α are set in a predetermined pattern in a region other than the region that corresponds to the image part A. In other words, an average of the light transmission levels in the region other than the region corresponding to the image part A is equivalent to a value that corresponds to an area proportion. The area proportion may be a proportion of the area of the region in which the values of the respective pieces of transmission level information α are "1" (i.e., transmission of light) and the area of the region in which the values of the respective pieces of transmission level information α are "0" (i.e., non-transmission of light). The pieces of transmission level information α may be so set, in the foregoing example manner, that the light transmission levels become low in the region that corresponds to the image part A, and that the light transmission levels become high in the region other than the region that corresponds to the image part A.

In the foregoing example, the values of the respective pieces of transmission level information α are set to "0" (i.e., non-transmission of light) in the region that corresponds to the image part A; however, embodiments of the invention are not limited to the foregoing example. The values of the respective pieces of transmission level information α may be set variously to cause the light transmission levels in the region that corresponds to the image part A to be lower than the light transmission levels in the region that is other than the region that corresponds to the image part A. For example, in the region that corresponds to the image part A, the values of the respective pieces of transmission level information α each may be set to a value that indicates translucence (e.g., may be set to "0.2" or any other value without limitation), or the values "1" and "0" of the pieces of transmission level information α may be set in a predetermined pattern.

Further, in the foregoing example, the values "1" and "0" of the pieces of transmission level information α are set in the predetermined pattern in the region that is other than the region that corresponds to the image part A; however, embodiments of the invention are not limited to the foregoing example. The values of the respective pieces of transmission level information α may be set variously to cause the light transmission levels in the region other than the region that corresponds to the image part A to be higher than the light transmission levels in the region that corresponds to the image part A. For example, in the region other than the region that corresponds to the image part A, the pattern of the values "1" and "0" of the pieces of transmission level information α may be made different for each frame image F. In one specific but non-limiting example, the parts having the value "1" (i.e., transmission of light) in the pattern of the values "1" and "0" illustrated in FIG. 4 may be varied between the pattern belonging to a certain frame image F and the pattern belonging to the subsequent frame image F. Further, in the region other than the region that corresponds to the image part A, the values of the respective pieces of transmission level information α may be set uniformly to a value that indicates translucence (e.g., may be set to "0.8" or any other value without limitation) or to the value of "1" (i.e., transmission of light).

The luminance information generating section 12 may generate the luminance information IR2, the luminance information IG2, and the luminance information IB2, based on the luminance information IR, the luminance information IG, and the luminance information IB included in the picture signal Sdisp and on the pieces of transmission level information α included in the transmission picture signal Sa. More specifically, the luminance information generating section 12 may utilize the luminance information IR, the luminance information IG, and the luminance information IB as they are as the luminance information IR2, the luminance information IG2, and the luminance information IB2 for any pixel in which the value of the transmission level information α is low (i.e., the pixel in which the light transmission level is low). For any pixel in which the value of the transmission level information α is high (i.e., the pixel in which the light transmission level is high), the luminance information generating section 12 may decrease the values of the luminance information IR, the luminance information IG, and the luminance information IB to thereby generate the luminance information IR2, the luminance information IG2, and the luminance information IB2. In other words, in view of the display section 14 which may be both the light-emission display device and the light transmissive device, the display section 14 may decrease the values of the respective pieces of luminance information for any pixel in which the value of the transmission level information α is high (i.e., the pixel in which the light transmission level is high) to thereby increase the light transmission level of any pixel P of the display section 14. The luminance information generating section 12 may generate the luminance information IR2, the luminance information IG2, and the luminance information IB2 in the foregoing example manner, based on the luminance information IR, the luminance information IG, and the luminance information IB and the pieces of transmission level information α. Further, the luminance information generating section 12 may output the thus-generated luminance information IR2, luminance information IG2, and luminance information IB2 as the picture signal Sdisp2.

The drive section 13 may drive the display section 14, based on the picture signal Sdisp2. The display section 14 may display an image by means of the light emission. The drive section 23 may drive the display section 24, based on the transmission picture signal Sa. The display section 24 may set the light transmission level for each of the pixels Q.

Figure 5A:
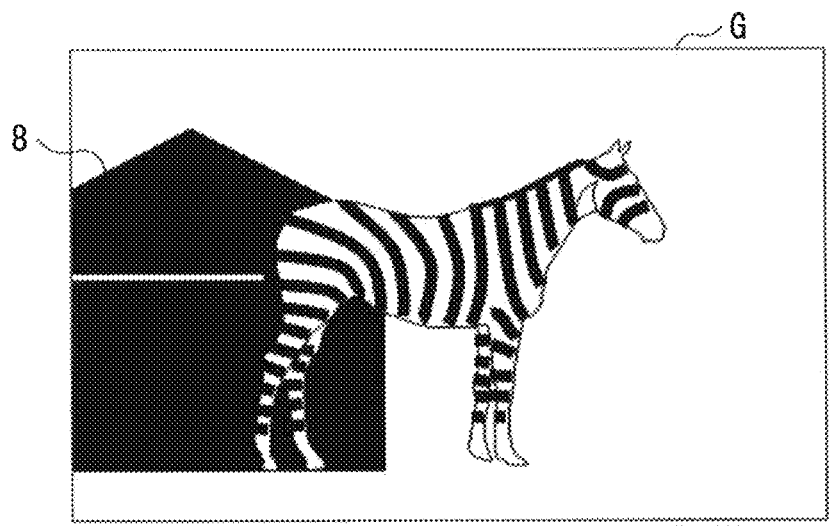
FIG. 5A describes an example of a viewed image to be seen by a user.

FIG. 5A illustrates an example of a viewed image G as an image to be seen by the user 9, under a bright environment including daytime without limitation. Under the bright environment, the user 9 is able to see the zebra with respect to the part at which the zebra is located, i.e., the image part A, and is able to see the landscape located on the far side of the display unit 1 (in the example illustrated in FIG. 5A, the house 8 under the bright environment) with respect to the part that is other than the part at which the zebra is located, i.e., the part other than the image part A. In other words, the values of the respective pieces of transmission level information α are low (i.e., the light transmission levels are low) for the part at which the zebra is located. i.e., the image part A, in the display unit 1. Hence, for the image part A, the display section 14 may perform the display that is based on the luminance information IR2, the luminance information IG2, and the luminance information IB2 which are respectively equivalent to the luminance information IR, the luminance information IG, and the luminance information IB included in the picture signal Sdisp, whereas the display section 24 may decrease the light transmission levels in the image part A to perform black display. As a result, the user 9 may see an image equivalent to the image represented by the picture signal Sdisp for the image part A. In contrast, the values of the respective pieces of transmission level information α are high (i.e., the light transmission levels are high) for the part that is other than the part at which the zebra is located, i.e., the part other than the image part A. Hence, the display section 14 and the display section 24 may increase the light transmission levels in the part other than the image part A. As a result, the user 9 may see the landscape located on the far side of the display unit 1 (in the example illustrated in FIG. 5A, the house 8 under the bright environment) for the part other than the image part A.

Figure 5B:
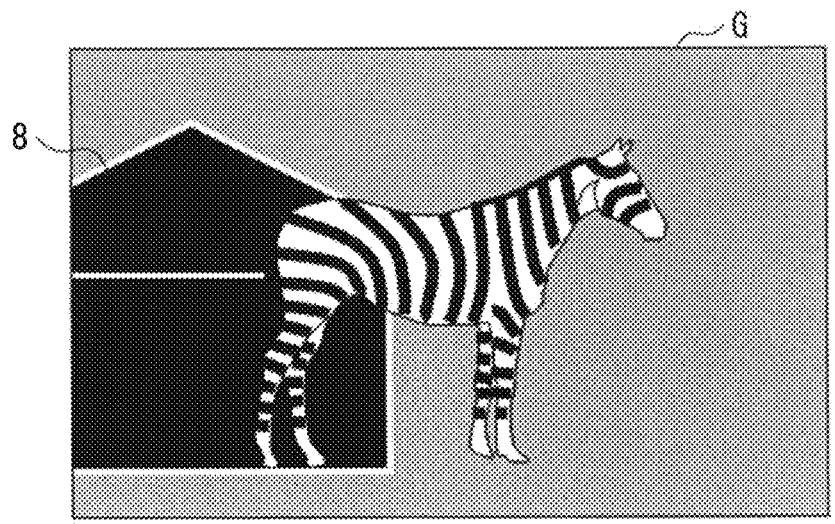
FIG. 5B describes another example of the viewed image to be seen by the user.

FIG. 5B illustrates an example of the viewed image G to be seen by the user 9 under a dark environment including the sunset without limitation. Under the dark environment, the user 9 is able to see the zebra with respect to the part at which the zebra is located, i.e., the image part A, and is able to see the landscape located on the far side of the display unit 1 (in the example illustrated in FIG. 5B, the house 8 under the dark environment) with respect to the part that is other than the part at which the zebra is located, i.e., the part other than the image part A. In other words, the values of the respective pieces of transmission level information α are low (i.e., the light transmission levels are low) for the part at which the zebra is located, i.e., the image part A, in the display unit 1. Hence, for the image part A, the display section 14 may perform the display that is based on the luminance information IR2, the luminance information IG2, and the luminance information IB2 which are respectively equivalent to the luminance information IR, the luminance information IG, and the luminance information IB included in the picture signal Sdisp, whereas the display section 24 may decrease the light transmission levels in the image part A to perform the black display. As a result, the user 9 may see the image equivalent to the image represented by the picture signal Sdisp for the image part A. In contrast, the values of the respective pieces of transmission level information α are high (i.e., the light transmission levels are high) for the part that is other than the part at which the zebra is located, i.e., the part other than the image part A. Hence, the display section 14 and the display section 24 may increase the light transmission levels in the part other than the image part A. As a result, the user 9 may see the landscape located on the far side of the display unit 1 (in the example illustrated in FIG. 5B, the house 8 under the dark environment) for the part other than the image part A.

According to the example embodiment as described above, the display unit 1 may set the luminance of each of the pixels P in the display section 14 and the light transmission level of each of the pixels Q in the display section 24, both based on the pieces of transmission level information α, thereby making it possible for the user 9 to see the image equivalent to the image represented by the picture signal Sdisp for the image part A, and to see the landscape located on the far side of the display unit 1 for the part that is other than the image part A. Hence, it is possible to increase visibility as compared with a comparative example to be described later.

Further, it is possible for the display unit 1 to perform the display simply by supplying the transmission picture signal Sa in addition to the picture signal Sdisp. Hence, it is possible to effectively utilize various picture resources in the past upon creating any picture content. In other words, the transmission picture signal Sa is small in data amount and thus simple as compared with the picture signal Sdisp, and is easily creatable based on the picture signal Sdisp accordingly, making it possible to prepare the transmission picture signal Sa easily based on the various picture resources in the past upon creating any picture content to be displayed on the display unit 1, and thereby to utilize such picture resources effectively. Moreover, the transmission picture signal Sa is simple and small in data amount, making it possible to create a new picture content without involving any substantial burden upon creating the new picture content.

Any of various display sections already put into practical use, including an organic EL display section and a liquid crystal display section without limitation, may be applied to each of the display sections 14 and 24 in the display unit 1, eliminating a necessity of newly developing a device. Hence, it is possible to effectively utilize an existing production line, and to suppress costs associated with the development.

Unlike a regular display unit, the display unit 1 makes it possible to display characters and images on the actual landscape in an overlaid fashion, allowing for representation as if the characters and the images are actually blended with the landscape on site. Hence, it is possible to provide a user with an experience of surprise like never before.

[Comparative Example]

A description is given next of workings of the example embodiment while making a comparison with a comparative example.

Figure 6:
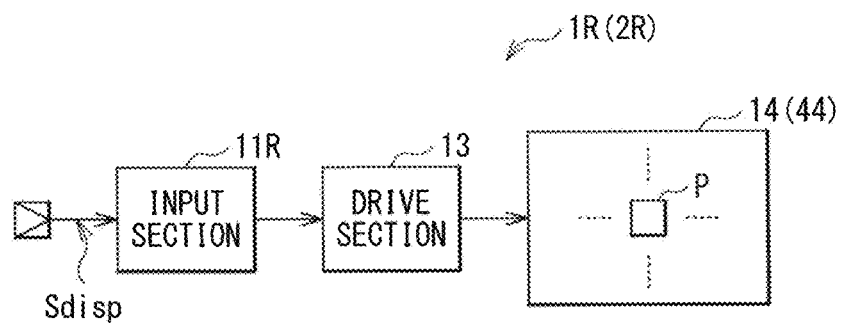
FIG. 6 is a block diagram illustrating an example of a configuration of a display unit according to a comparative example of the first example embodiment.

FIG. 6 illustrates an example of a configuration of a display unit 1R according to a comparative example. The display unit 1R includes an input section 11R, the drive section 13, and the display section 14. The input section 11R is an input interface that receives the picture signal Sdisp, and supplies the drive section 13 with the picture signal Sdisp. In other words, the display unit 1R according to the comparative example has a configuration in which the luminance information generating section 12, the drive section 23, and the display section 24 are removed from the display unit 1 according to the example embodiment, and performs display only based on the picture signal Sdisp without using the transmission picture signal Sa.

Figure 7:
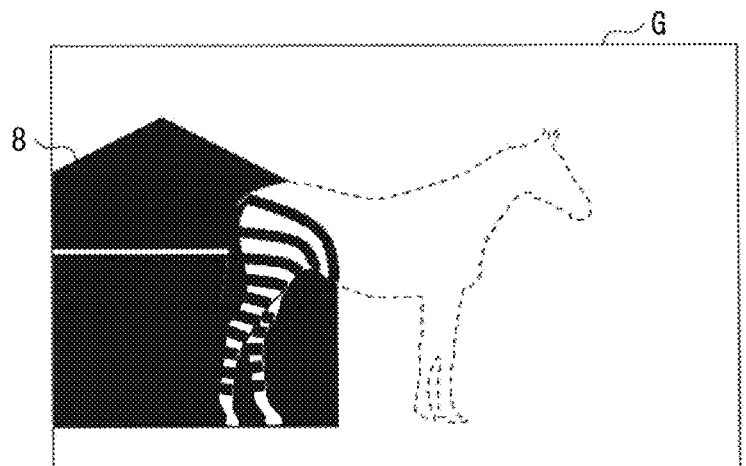
FIG. 7 describes an example of a viewed image according to a comparative example of the first example embodiment.

FIG. 7 illustrates an example of the viewed image G to be seen by the user 9 under the bright environment including daytime without limitation. The display unit 1R performs the display, based on the luminance information IR, the luminance information IG and the luminance information IB included in the picture signal Sdisp. Under such a circumstance, the values of the respective luminance information IR, luminance information IG, and luminance information IB are low in black parts in the frame image F (see FIG. 3), i.e., black parts in the stripe pattern of the zebra and the part other than the zebra. Hence, the light transmission levels are high in those parts in the display section 14 which may be both the light-emission display device and the light transmissive device. As a result, the user 9 sees the landscape located on the far side of the display unit 1R (in the example illustrated in FIG. 7, the house 8 under the bright environment) for those parts. In contrast, the values of the respective luminance information IR, luminance information IG, and luminance information IB are high in white parts in the frame image F (see FIG. 3) i.e., white parts in the stripe pattern of the zebra. Hence, the display section 14 displays a white color by means of the light emission for those white parts.

The comparative example may thus make it difficult for the user 9 to see the zebra with respect to, for example, a part of the zebra which is not overlapped with the house 8 as illustrated in FIG. 7. In other words, in the part of the zebra which is not overlapped with the house 8, the user 9 sees the white color derived from the light emission of the display section 14 for the white parts in the stripe pattern of the zebra, whereas the user 9 sees the landscape located on the far side of the display unit 1R (i.e., the landscape under the bright environment) owing to transmission of light through the display section 14 for the black parts in the stripe pattern of the zebra. In the comparative example, the user 9 may find it difficult to see the zebra due to a small difference between the white color derived from the light emission of the display section 14 and the white color derived from the environment (i.e., the landscape under the bright environment).

Further, the comparative example may make it difficult for the user 9 to see the zebra with respect to, for example, a part of the zebra which is overlapped with the house 8 as well. In other words, in the part of the zebra which is overlapped with the house 8, the user 9 sees the white color derived from the light emission of the display section 14 for the white parts in the stripe pattern of the zebra, whereas the user 9 sees the landscape located on the far side of the display unit 1R (i.e., the house 8) owing to transmission of light through the display section 14 for the black parts in the stripe pattern of the zebra. In the comparative example, the user 9 may find it difficult to see the zebra due to a small difference between the white color derived from the light emission of the display section 14 and the white color derived from the environment (i.e., the house 8) when, for example, the house 8 is white in color. Likewise, the user 9 may see the blue and white stripe pattern when, for example, the house is blue in color.

In contrast, the display unit 1 according to the example embodiment may set the luminance of each of the pixels P in the display section 14 and the light transmission level of each of the pixels Q in the display section 24, both based on the pieces of transmission level information α. Thus, in the display unit 1, the display section 14 may display the image that is equivalent to the image represented by the picture signal Sdisp whereas the display section 24 may decrease the light transmission levels to perform black display, for the part at which the zebra is located (i.e., the image part A). For the part that is other than the part at which the zebra is located, the display section 14 and the display section 24 may increase the light transmission levels. Hence, it is possible for the user 9 to see the black and white stripe pattern of the zebra even under the bright environment such as the daytime as illustrated in FIG. 5A. Accordingly, it is possible for the display unit 1 to increase visibility irrespective of a display content and an environment under which the display unit 1 is used as described above.

[Example Effect]

According to the foregoing example embodiment, two display sections including the display section 14 and the display section 24 are provided. An image is displayed on the display section 14, and the light transmission level is set for each pixel in the display section 24. Hence, it is possible to increase visibility irrespective of a display content and an environment under which the display unit is used.

According to the foregoing example embodiment, the luminance of each of the pixels P in the display section 14 is set based on the pieces of transmission level information α and the light transmission level of each of the pixels Q in the display section 24 is set also based on the pieces of transmission level information α. Hence, it is possible to increase the visibility.

The foregoing example embodiment makes it possible to perform the display simply by supplying the transmission picture signal in addition to the picture signal. Hence, it is possible to effectively utilize various picture resources in the past upon creating any picture content.

The foregoing example embodiment makes it possible to apply any of various display sections already put into practical use to each of the two display sections, eliminating a necessity of newly developing a device. Hence, it is possible to effectively utilize an existing production line, and to suppress costs associated with the development.

The foregoing example embodiment makes it possible to display characters and images on the actual landscape in an overlaid fashion, allowing for representation as if the characters and the images are actually blended with the landscape on site. Hence, it is possible to provide a user with an experience of surprise like never before.

[Modification Example 1-1]

In the foregoing example embodiment, the part at which the zebra is located may be set as the image part A. However, the image part A is not limited thereto. Any region is settable as the image part A, as described in detail below as a modification example.

Figure 8:
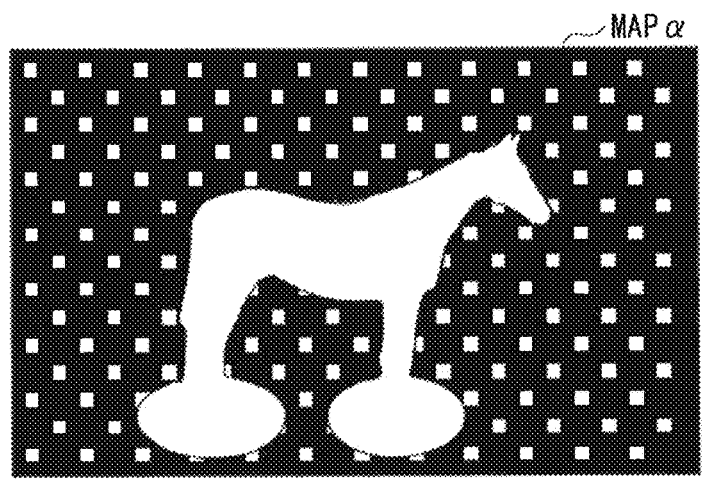
FIG. 8 describes an example of a transmission picture signal according to a modification example.

FIG. 8 illustrates an example of the map data MAPα of the pieces of transmission level information α that are represented by the transmission picture signal Sa. In this example, a wider part including the part at which the zebra is located is set as the image part A, without limitation. More specifically, not only the part at which the zebra is located but also parts around the legs of the zebra are set as the image part A.

Figure 9A:
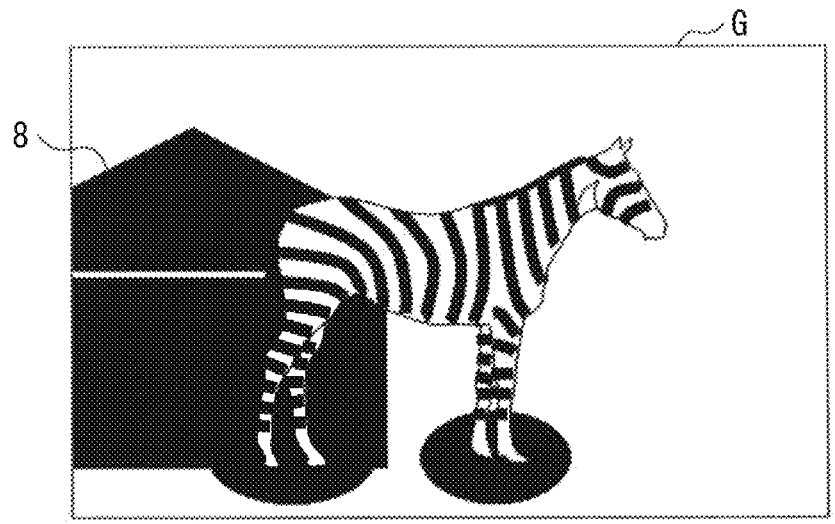
FIG. 9A describes an example of a viewed image according to the modification example.
Figure 9B:
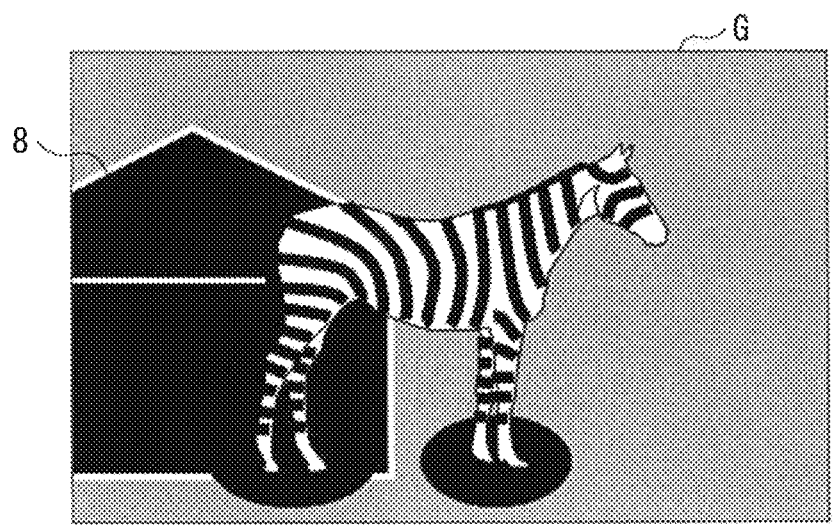
FIG. 9B describes another example of the viewed image according to the modification example.

FIG. 9A illustrates an example of the viewed image G to be seen by the user 9 under the bright environment. FIG. 9B illustrates an example of the viewed image G to be seen by the user 9 under the dark environment. In these illustrated examples, it is possible for the user 9 to see the display based on the picture signal Sdisp for the part at which the zebra is located and the parts around the legs of the zebra, and to see the landscape located on the far side of the display unit for the part other than those parts.

In the example illustrated in FIG. 8, the wider part including the part at which the zebra is located is set as the image part A. However, the image part A is not limited thereto. In an alternative embodiment, only a part of the zebra (for example but not limited to, a face of the zebra) may be set as the image part A.

[Modification Example 1-2]

In the foregoing example embodiment, the luminance information generating section 12 may generate the picture signal Sdisp2 and the drive section 23 may drive the display section 24, both based on the transmission picture signal Sa. However, embodiments of the invention are not limited thereto. For example, a display unit 1B according to an alternative embodiment illustrated in FIG. 10 may include a filter section 15B that performs a filtering process on the transmission picture signal Sa to thereby generate a transmission picture signal Sb. In the alternative embodiment, the luminance information generating section 12 may generate the picture signal Sdisp2, based on the picture signal Sdisp and the transmission picture signal Sb, and the drive section 23 may drive the display section 24, based on the transmission picture signal Sb. More specifically, the filter section 15B may perform, for example but not limited to, a smoothing process (a so-called anti-aliasing process) on the map data MAPα of the pieces of transmission level information α that are represented by the transmission picture signal Sa to allow for a smooth change in the pieces of transmission level information α between the image part A and any other part. The filter section 15B may include, for example but not limited to, a finite impulse response (FIR) filter.

Figure 10:
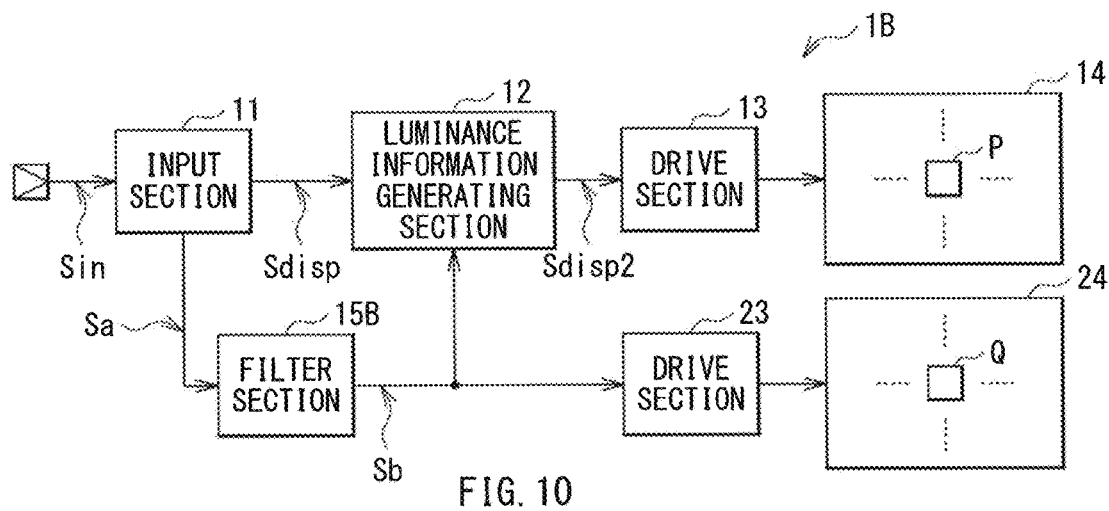
FIG. 10 is a block diagram illustrating an example of a configuration of a display unit according to another modification example.

In the example illustrated in FIG. 10, the display unit 1B may be provided with the filter section 15B. However, embodiments of the invention are not limited thereto. Alternatively, the display unit may be provided without the filter section 15B, and the transmission picture signal Sb having been subjected to the filtering process may be multiplexed with the picture signal Sdisp to be supplied to the display unit.

[Modification Example 1-3]

In the foregoing example embodiment, the signal Sin in which the picture signal Sdisp and the transmission picture signal Sa are multiplexed with each other may be supplied to the display unit 1. However, embodiments of the invention are not limited thereto. In the following, a description is given in detail of a modification example with reference to some examples.

Figure 11:
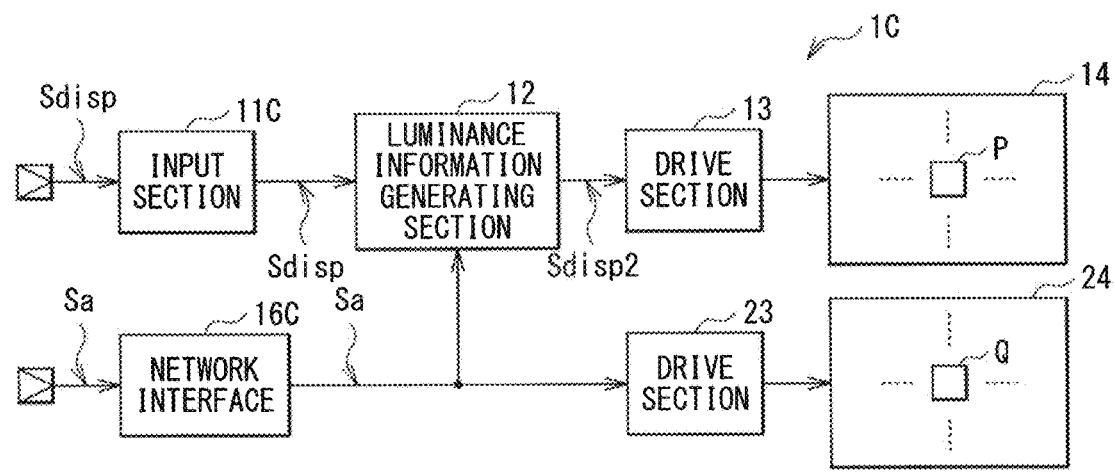
FIG. 11 is a block diagram illustrating an example of a configuration of a display unit according to another modification example.

FIG. 11 illustrates an example of a configuration of a display unit 1C according to a modification example. The display unit 1C may perform the display, based on the picture signal Sdisp and the transmission picture signal Sa that are supplied separately from each other. The display unit 1C may include an input section 11C and a network interface 16C. The input section 11C may be an input interface that receives the picture signal Sdisp, and supply the luminance information generating section 12 with the received picture signal Sdisp. In this example, without limitation, the network interface 16C may be an interface based on a local area network (LAN) and connected to the Internet. The display unit 1C may receive the picture signal Sdisp from, for example but not limited to, a DVD (Registered Trademark) player or any other device having a player function. Further, the display unit 1C may obtain the transmission picture signal Sa that corresponds to the received picture signal Sdisp from a server on the Internet. The display unit 1C may perform the display, based on the picture signal Sdisp and the transmission picture signal Sa that are obtained in the foregoing example manner.

Figure 12:
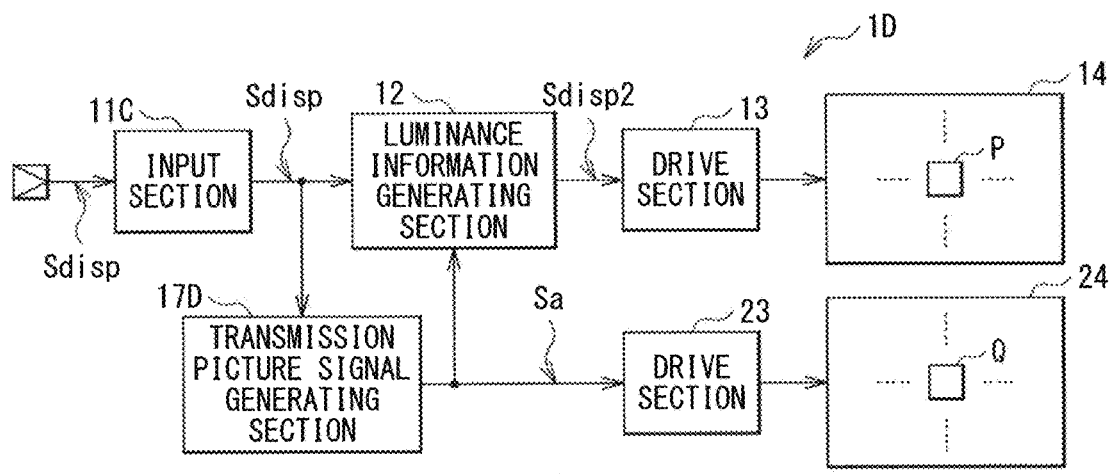
FIG. 12 is a block diagram illustrating an example of a configuration of a display unit according to another modification example.

FIG. 12 illustrates an example of a configuration of another display unit 1D according to a modification example. The display unit 1D may include a transmission picture signal generating section 17D. The transmission picture signal generating section 17D may generate the transmission picture signal Sa, based on the picture signal Sdisp supplied from the input section 1C, and supply the luminance information generating section 12 and the drive section 23 with the transmission picture signal Sa. Upon generating the transmission picture signal Sa, the transmission picture signal generating section 17D may detect a key display object in the frame image F represented by the picture signal Sdisp by means of pattern recognition or any other detection scheme, for example. Non-limiting examples of the display object in the frame image F may include a person and an animal. Further, the transmission picture signal generating section 17D may set a part at which the display object is located in the frame image F as the image part A to generate the transmission picture signal Sa. Upon setting the image part A, the transmission picture signal generating section 17D may so set the values of the respective pieces of transmission level information α that the light transmission levels become low in the region that corresponds to the image part A, and that the light transmission levels become high in the region other than the region that corresponds to the image part A. With this example configuration, the display unit 1D is able to generate, based on the picture signal Sdisp, the transmission picture signal Sa even without the supply of the transmission picture signal Sa, making it possible to achieve effects similar to the example effects achieved by the foregoing example embodiment. Hence, it is possible to utilize various picture resources in the past as they are for the display unit 1D.

[Modification Example 1-4]

In the foregoing example embodiment, two-dimensional (2D) display is performed based on the picture signal Sdisp. However, embodiments of the invention are not limited thereto. In an alternative embodiment, three-dimensional (3D) display, or stereoscopic display, may be performed. In the following, a description is given in detail of a modification example with reference to some examples.

Figure 13:
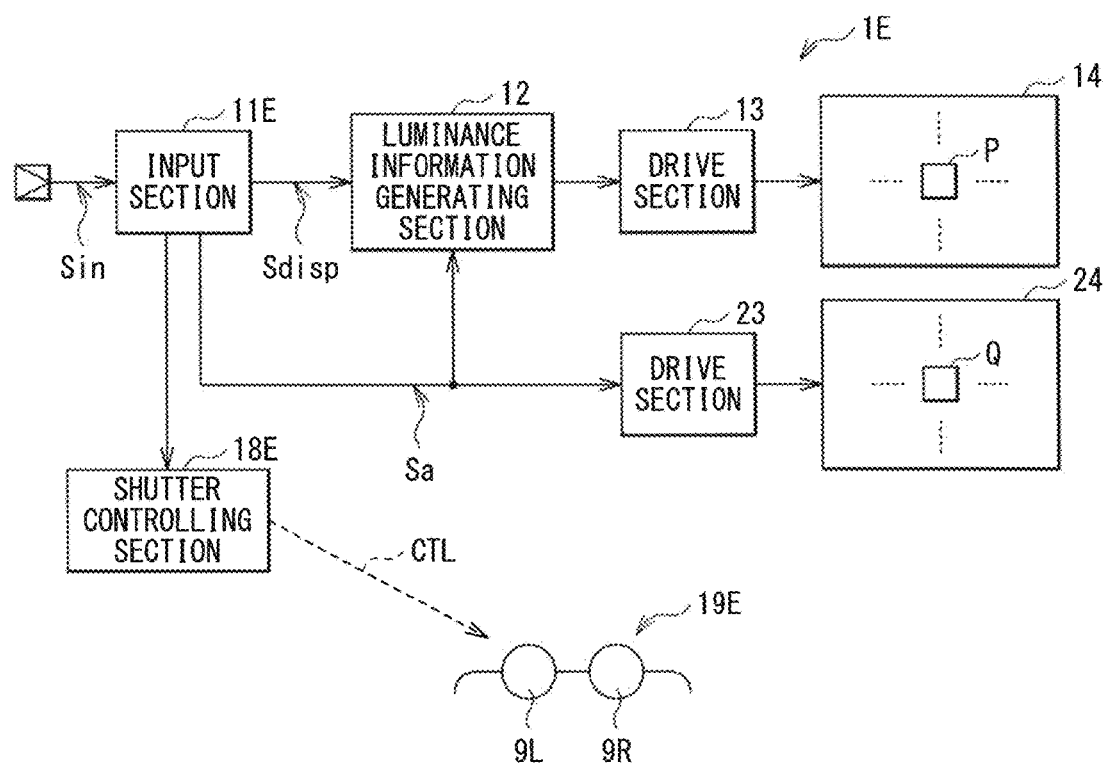
FIG. 13 is a block diagram illustrating an example of a configuration of a display unit according to another modification example.

FIG. 13 illustrates an example of a configuration of a display unit 1E according to a modification example. The display unit 1E may be a stereoscopic display unit that utilizes an active shutter scheme. The display unit 1E may include an input section 11E, a shutter controlling section 18E, and shutter eyeglasses 19E. As with the input section 11, the input section 11E may be an input interface that receives the signal Sin, and separate the picture signal Sdisp and the transmission picture signal Sa from the signal Sin. In this example, without limitation, the picture signal Sdisp may include the luminance information IR, the luminance information IG, and the luminance information IB which are directed to a left-eye image FL, and the luminance information IR, the luminance information IG, and the luminance information IB which are directed to a right-eye image FR. Further, in this example, without limitation, the transmission picture signal Sa may include the map data MAPα that corresponds to the left-eye image FL, and the map data MAPα that corresponds to the right-eye image FR. The input section 11E may also have a function of supplying the shutter controlling section 18E with a control signal. The shutter controlling section 18E may generate a shutter control signal CTL, based on the control signal supplied from the input section 11E, and may supply the shutter eyeglasses 19E with the thus-generated shutter control signal CTL through a wireless communication. In this example, the shutter controlling section 18E may supply the shutter eyeglasses 19E with the shutter control signal CTL through the wireless communication; however, a method of supplying the shutter control signal CTL is not limited to the wireless communication. In one embodiment, the shutter controlling section 18E may supply the shutter eyeglasses 19E with the shutter control signal CTL through a wired communication. The shutter eyeglasses 19E may be a shutter device in a form of eyeglasses, and may enable a stereoscopic vision when the unillustrated user 9 uses the shutter eyeglasses 19E. The shutter eyeglasses 19E may have a left-eye shutter 9L and a right-eye shutter 9R. The left-eye shutter 9L and the right-eye shutter 9R each may be, for example but not limited to, a liquid crystal shutter. The left-eye shutter 9L and the right-eye shutter 9R each may be set to a light-transmission state (an open state) and a light-blocking state (a closed state). The light-transmission state and the light-blocking state of each of the left-eye shutter 9L and the right-eye shutter 9R may be controlled by the shutter control signal CTL supplied from the shutter controlling section 18E.

Figure 14:
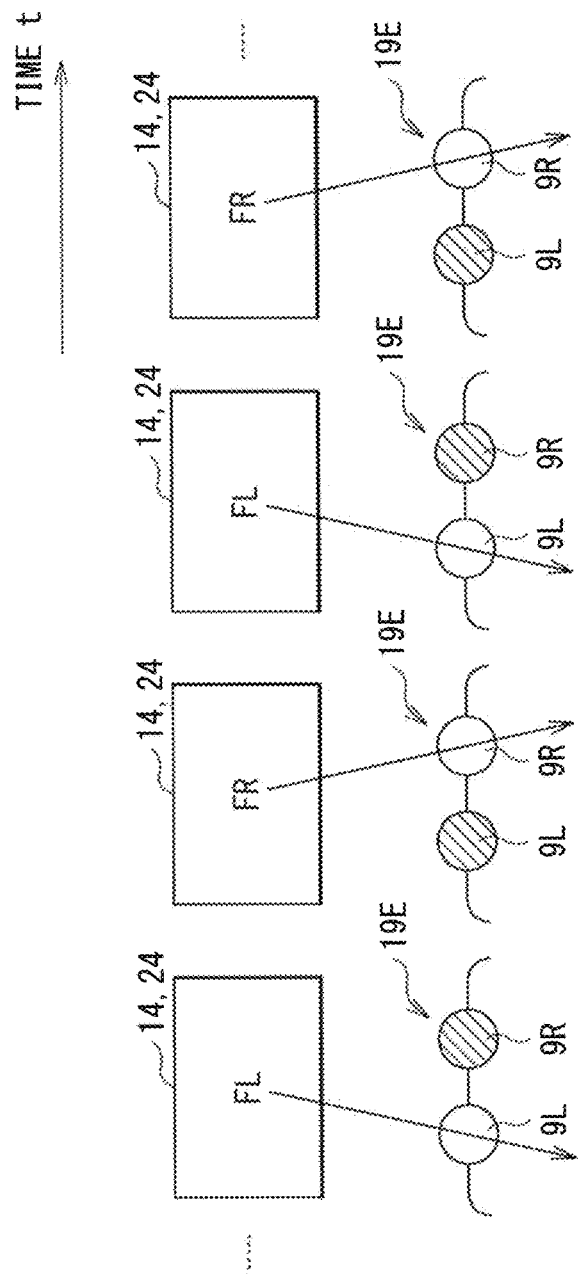
FIG. 14 schematically illustrates an example of an operation of the display unit illustrated in FIG. 13.

FIG. 14 schematically illustrates an example of an operation of the stereoscopic display performed in the display unit 1E. In the display unit 1E, the display section 14 and the display section 24 may display the left-eye image FL and the right-eye image FR alternately on an axis of time. When the display section 14 and the display section 24 display the left-eye image FL, the left-eye shutter 9L of the shutter eyeglasses 19E may be set to the open state, whereas the right-eye shutter 9R of the shutter eyeglasses 19E may be set to the closed state, allowing the user 9 to see the left-eye image FL with his/her left eye. When the display section 14 and the display section 24 display the right-eye image FR, the left-eye shutter 9L of the shutter eyeglasses 19E may be set to the closed state, whereas the right-eye shutter 9R of the shutter eyeglasses 19E may be set to the open state, allowing the user 9 to see the right-eye image FR with his/her right eye. A repetition of the foregoing operations in an alternate fashion allows the user 9 to recognize a picture configured by a series of those images as a stereoscopic picture having a depth, owing to a parallax present between the left-eye image FL and the right-eye image FR.

Figure 15:
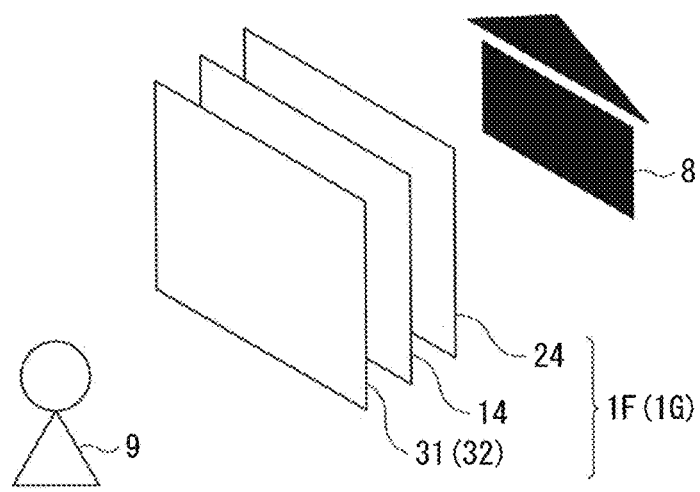
FIG. 15 describes an example of a configuration of a display unit according to another modification example.
Figure 16:
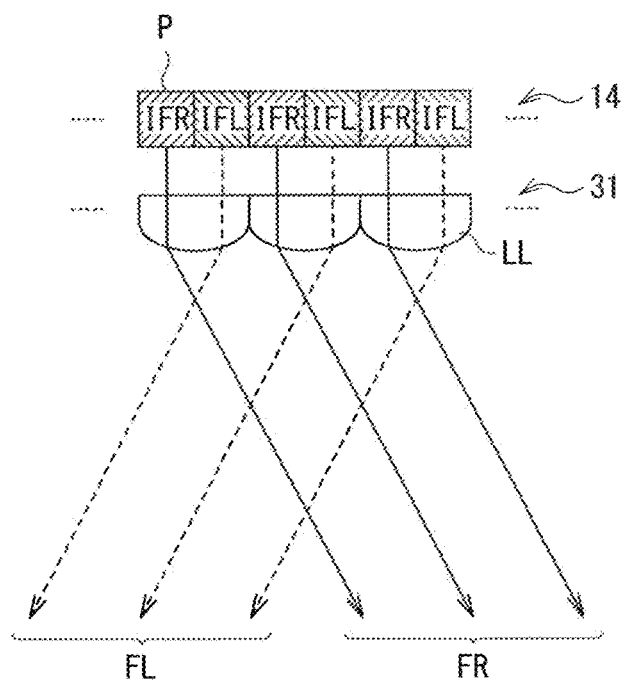
FIG. 16 schematically illustrates an example of an operation of the display unit according to another modification example.

FIG. 15 illustrates an example of a configuration of another display unit 1F according to a modification example. FIG. 16 schematically illustrates an example of an operation of the stereoscopic display performed in the display unit 1F. The display unit 1F may be a stereoscopic display unit that utilizes a lenticular-lens scheme. Referring to FIG. 15, the display unit 1F may include a lenticular sheet 31. The lenticular sheet 31 may be provided in front of the display section 14. Referring to FIG. 16, the lenticular sheet 31 may have a configuration in which horizontally-curved convex lenses, i.e., lenticular lenses LL, are disposed side-by-side in a horizontal direction. The lenticular lenses LL in the lenticular sheet 31 each may be so disposed as to correspond to two of the pixels P of the display section 14 in the horizontal direction. The pixels P in the display section 14 each may perform, in an alternate fashion in the horizontal direction, display that is based on luminance information IFL and display that is based on luminance information IFR. The luminance information IFL may be directed to the left-eye image FL, whereas the luminance information IFR may be directed to the right-eye image FR. The pixels Q in the display section 24 each may perform, in an alternate fashion in the horizontal direction, unillustrated display that is based on transmission level information αFL and display that is based on transmission level information αFR. The transmission level information αFL may be directed to the left-eye image FL, whereas the transmission level information αFR may be directed to the right-eye image FR. With this example configuration, light based on the luminance information IFL may be refracted by any lenticular lens LL, whereby the light may travel toward the bottom left of FIG. 16, whereas light based on the luminance information IFR may be refracted by any lenticular lens LL, whereby the light may travel toward the bottom right of FIG. 16. As a result, the user 9 may see, as the left-eye image FL, the light based on the luminance information IFL with his/her left eye, and see, as the right-eye image FR, the light based on the luminance information IFR with his/her right eye, thereby making it possible for the user 9 to recognize the picture displayed on the display unit 1F as the stereoscopic picture.

Figure 17:
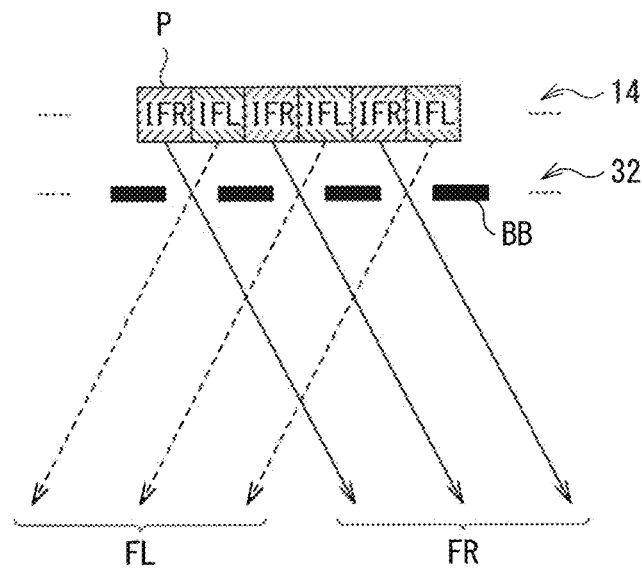
FIG. 17 schematically illustrates an example of an operation of a display unit according to another modification example.

FIG. 17 schematically illustrates an example of an operation of the stereoscopic display performed in another display unit 1G according to a modification example. The display unit 1G may be a stereoscopic display unit that utilizes a parallax barrier scheme. Referring to FIG. 17, the display unit 1G may include a parallax barrier 32. The parallax barrier 32 may be provided in front of the display section 14. The parallax barrier 32 may have a configuration in which light-blocking barriers BB are disposed side-by-side in a horizontal direction. The barriers BB in the parallax barrier 32 each may be so disposed as to correspond to two of the pixels P of the display section 14 in the horizontal direction. The pixels P in the display section 14 each may perform, in an alternate fashion in the horizontal direction, display that is based on the luminance information IFL and display that is based on the luminance information IFR. The luminance information IFL may be directed to the left-eye image FL, whereas the luminance information IFR may be directed to the right-eye image FR. The pixels Q in the display section 24 each may perform, in an alternate fashion in the horizontal direction, unillustrated display that is based on the transmission level information αFL and display that is based on the transmission level information αFR. The transmission level information αFL may be directed to the left-eye image FL, whereas the transmission level information αFR may be directed to the right-eye image FR. With this example configuration, a traveling direction of light based on the luminance information IFL may be restricted by any barrier BB, whereby the light may travel toward the bottom left of FIG. 17, whereas a traveling direction of light based on the luminance information IFR may be restricted by any barrier BB, whereby the light may travel toward the bottom right of FIG. 17. As a result, the user 9 may see, as the left-eye image FL, the light based on the luminance information IFL with his/her left eye, and see, as the right-eye image FR, the light based on the luminance information IFR with his/her right eye, thereby making it possible for the user 9 to recognize the picture displayed on the display unit 1G as the stereoscopic picture.

[Modification Example 1-5]

In the foregoing example embodiment, two display sections, i.e., the display section 14 and the display section 24, are used to configure the display unit 1. However, embodiments of the invention are not limited thereto. In an alternative embodiment, three display sections may be used to configure a display unit 1H. In the following, a description is given in detail of this modification example.

Figure 18:
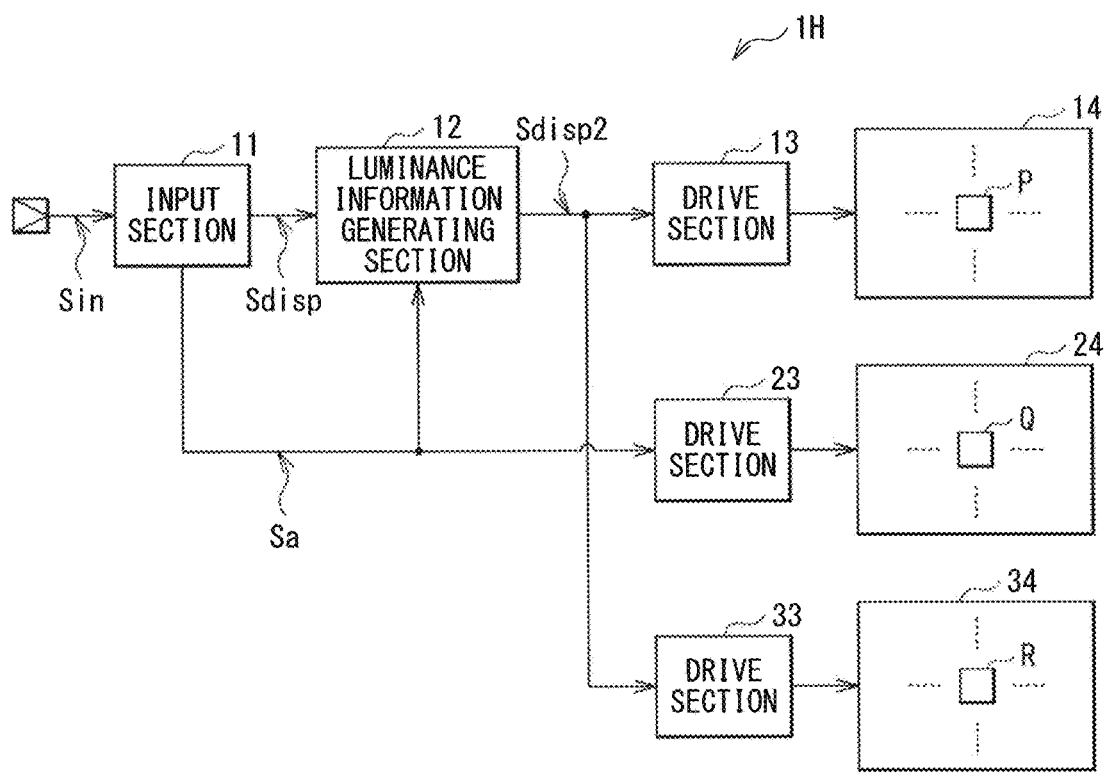
FIG. 18 is a block diagram illustrating an example of a configuration of a display unit according to another modification example.
Figure 19:
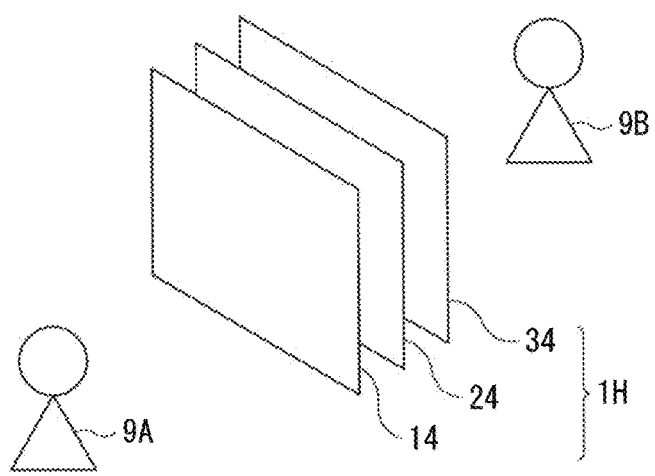
FIG. 19 describes an example of a configuration of the display unit illustrated in FIG. 18.

FIG. 18 illustrates an example of a configuration of the display unit 1H. The display unit 1H may include a display section 34 and a drive section 33. FIG. 19 illustrates a layout of the display section 14, the display section 24, and the display section 34.

As with the display section 14, the display section 34 may be a light transmissive display section in which a display region is transparent, and may display, based on drive performed by the drive section 33, an image by means of light emission. The display section 34 may be so disposed on the far side of the display section 24 as to be overlapped with the display section 24 as illustrated in FIG. 19. In other words, the display unit 1H may be so configured as to allow a user 9A on the display section 14 side to see an image, and as to allow a user 9B on the display section 34 side to see an image. The display section 34 may have a configuration in which pixels R are arranged in matrix as illustrated in FIG. 18. In this example, without limitation, the pixels R in the display section 34 each may correspond to corresponding one of the pixels Q in the display section 24. In one embodiment of the invention, the display section 34 corresponds to a "third display section" without limitation.

The drive section 33 may drive the display section 34, based on the picture signal Sdisp2. More specifically, the drive section 33 may drive, based on the picture signal Sdisp2, each of the pixels R of the display section 34 by means of line-sequential scanning to cause the display section 34 to perform display that is based on the picture signal Sdisp2. Here, the drive section 33 may cause the display section 34 to display an image that is a horizontally-inverted image of the image to be displayed on the display section 14. Accordingly, the image to be viewed by the user 9A is a horizontally-inverted image of the image to be viewed by the user 9B.

With this example configuration, it is possible for the display unit 1H to increase visibility irrespective of a display content and an environment under which the display unit 1H is used, and to allow users to see images from both sides.

In this example, the display section 14 and the display section 34 display respective images that are inverted with respect to each other. However, embodiments of the invention are not limited thereto. In an alternative embodiment, the display section 14 and the display section 34 may display respective images that are different from each other. For example, two images that are obtained as a result of photographing a photographic object from mutually-different directions may be displayed on the respective display sections 14 and 34. In a specific but non-limiting example where an object to be displayed is a person, the display section 14 may display an image of the person as seen from the front, whereas the display section 34 may display an image of the person as seen from the back. Hence, the display unit 1H makes it possible to perform the display that involves higher reality.

[Modification Example 1-6]

In the foregoing example embodiment, the display section 14 and the display section 24 each perform the display, based on the transmission picture signal Sa supplied from the outside. However, embodiments of the invention are not limited thereto. In an alternative embodiment, a plurality of display modes M may be provided to allow display operations to be changed. In the following, a description is given in detail of this modification example.

Figure 20:
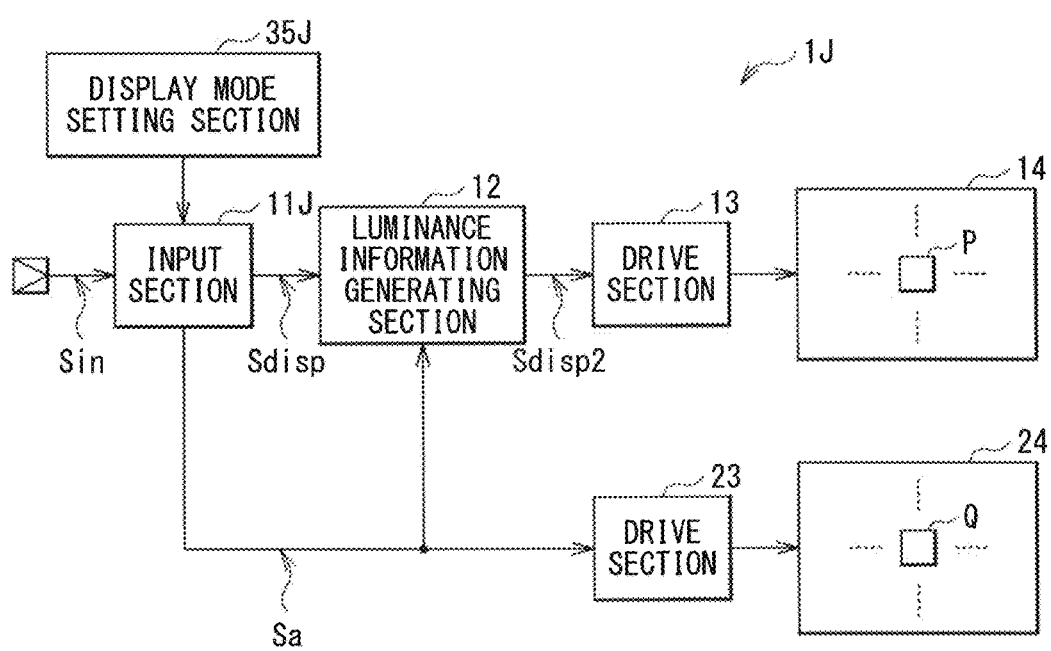
FIG. 20 is a block diagram illustrating an example of a configuration of a display unit according to another modification example.

FIG. 20 illustrates an example of a configuration of a display unit 1J according to a modification example. The display unit 1J may include a display mode setting section 35J and an input section 11J. In this example, the display unit 1J may include two display modes M1 and M2, without limitation. The display mode setting section 35J may select one of the display modes M1 and M2, based on a user's operation, and send a result of the selection to the input section 11J.

When the display mode M1 is selected, the input section 11J may separate the picture signal Sdisp and the transmission picture signal Sa from the signal Sin, and may supply the luminance information generating section 12 with the picture signal Sdisp and the luminance information generating section 12 and the drive section 23 with the transmission picture signal Sa, as with the foregoing example embodiment. It is thereby possible for the user 9 to see the image equivalent to the image represented by the picture signal Sdisp for the image part A, and to see the landscape located on the far side of the display unit 1J for the part that is other than the image part A.

When the display mode M2 is selected, the input section 11J may separate the picture signal Sdisp and the transmission picture signal Sa from the signal Sin, and may supply the luminance information generating section 12 with the picture signal Sdisp. Further, the input section 11J may replace all of the values of the respective pieces of transmission level information α in the transmission picture signal Sa with the value "0" (non-transmission of light), and supply the luminance information generating section 12 and the drive section 23 with the thus-replaced transmission picture signal Sa. Hence, the display section 14 may perform the display that is based on the luminance information IR2, the luminance information IG2, and the luminance information IB2 which are respectively equivalent to the luminance information IR, the luminance information IG, and the luminance information IB included in the picture signal Sdisp, whereas the display section 24 may set a screen of the display section 24 as a whole to be non-transmissive to perform black display. In the display mode M2, it is thereby possible for the user 9 to see the image equivalent to the frame image F represented by the picture signal Sdisp (for example, the frame image F illustrated in FIG. 3) on the entire screen of the display unit 1J.

[Modification Example 1-7]

In the foregoing example embodiment, the luminance information generating section 12 may be provided, and the picture signal Sdisp2 may be generated based on the picture signal Sdisp and the transmission picture signal Sa. However, embodiments of the invention are not limited thereto. In an alternative embodiment, the luminance information generating section 12 may be eliminated, and the drive section 13 may operate based on the picture signal Sdisp.

[Modification Example 1-8]

Figure 21:
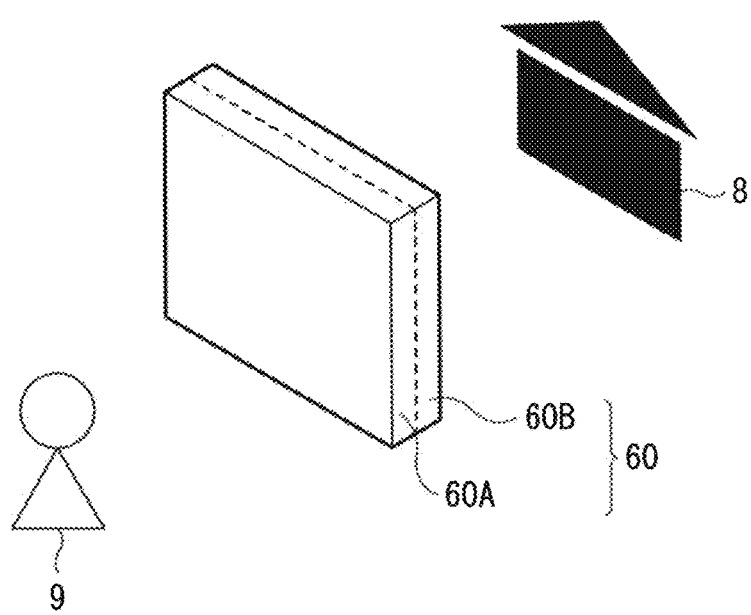
FIG. 21 describes an example of a configuration of a display unit according to another modification example.

In the foregoing example embodiment, the display section 14 and the display section 24 may be provided separately from each other, and may be so disposed as to be overlapped with each other. However, embodiments of the invention are not limited thereto. In an alternative embodiment, the display section 14 and the display section 24 may be provided integrally as illustrated in FIG. 21 that illustrates a display unit 60 according to a modification example. The display unit 60 may include a display section 60A and a display section 60B which are formed integrally. The display section 60A may correspond to the display section 14, and the display section 60B may correspond to the display section 24. In one specific but non-limiting example, the display unit 60 may have a configuration in which the pixels P and the pixels Q are formed in a stacked fashion.

[Other Modification Examples]

Two or more of the foregoing example embodiments and modification examples may be combined. Such combinations each may be considered as an example embodiment of the invention as well.

[2. Second Example Embodiment]

A description is given next of a display unit 2 according to a second example embodiment. The second example embodiment is directed to a configuration in which one of the two display sections located on the user 9 side is a non-light-emission display section. Note that the same or equivalent elements as those of the display unit 1 according to the first example embodiment described above are denoted with the same reference numerals, and will not be described in detail.

[Configuration Example]

Referring to FIGS. 1 and 2, the display unit 2 may include a display section 44, a display section 54, and a luminance information generating section 42.

The display section 44 may be a light transmissive display section in which a display region is transparent, and may display, based on the drive performed by the drive section 13, an image by means of setting light transmission levels. Such a display section 44 may include, without limitation, a liquid crystal device or any other device that allows for display of an image by means of setting of the light transmission levels. The display section 44 may be so disposed in front of the display section 54 as to be overlapped with the display section 54 as illustrated in FIG. 2. The display section 44 may have a configuration in which the pixels P are arranged in matrix. In the example embodiment, the pixels P each may include the unillustrated red (R) sub-pixel PsubR, the unillustrated green (G) sub-pixel PsubG, and the unillustrated blue (B) sub-pixel PsubB. The sub-pixel PsubR may include a red color filter. The sub-pixel PsubG may include a green color filter. The sub-pixel PsubB may include a blue color filter. The display section 44 may set the light transmission levels of the respective sub-pixel PsubR, sub-pixel PsubG, and sub-pixel PsubB, based on the luminance information IR2, the luminance information IG2, and the luminance information IB2, thereby allowing an image to be displayed.

The display section 54 may be a light transmissive display section in which a display region is transparent, and may emit white light, based on the drive performed by the drive section 23. Such a display section 54 may include an organic EL device or an inorganic EL device. However, embodiments of the invention are not limited thereto. Any other device may be used as long as the device achieves the light transmissive display section that allows for emission of white light. In one embodiment, a technology used for a field emissive display (FED) may be applied to the display section 54. In an alternative embodiment, a technology used for a light control sheet may be applied to the display section 54. The light control sheet may be, for example but not limited to, an UMU film (Registered Trademark). In this case, a light source may be further provided, and light emitted from the light source may be subjected to diffuse reflection by the light control sheet to display a white color on the display section 54. A luminescent material that emits the white light may be, for example but not limited to, a material that includes a phosphor that emits light in a wide wavelength range near a blue wavelength range and a phosphor that emits light in a wide wavelength range near a yellow wavelength range. Referring to FIG. 2, the display section 54 may be so disposed behind the display section 44 as to be overlapped with the display section 44. The display section 54 may have a configuration in which the pixels Q are arranged in matrix. The pixels Q each may be so configured that a luminance of the white light is settable, based on the corresponding transmission level information α. In other words, each of the pixels Q may involve the lower luminance and may thus involves the higher light transmission level as the value of the transmission level information α becomes higher, and may involve the higher luminance of the white light as the value of the transmission level information α becomes lower.

As with the luminance information generating section 12 according to the foregoing first example embodiment, the luminance information generating section 42 may generate the picture signal Sdisp2, based on the picture signal Sdisp and the transmission picture signal Sa. More specifically, the luminance information generating section 42 may generate the luminance information IR2, the luminance information IG2, and the luminance information IB2, based on the luminance information IR, the luminance information IG, and the luminance information IB on a certain pixel and based on the transmission level information α on that pixel. Here, the luminance information generating section 42 may utilize the luminance information IR, the luminance information IG, and the luminance information IB as they are as the luminance information IR2, the luminance information IG2, and the luminance information IB2 for any pixel in which the value of the transmission level information α is sufficiently low (i.e., the pixel in which the light transmission level is sufficiently low). For any pixel in which the value of the transmission level information α is high (i.e., the pixel in which the light transmission level is high), the luminance information generating section 42 may increase the values of the luminance information IR, the luminance information IG, and the luminance information IB to thereby generate the luminance information IR2, the luminance information IG2, and the luminance information IB2. In other words, in view of the display section 44 which may be a device that allows for variable light transmission levels, the display section 44 may increase the values of the respective pieces of luminance information for any pixel in which the value of the transmission level information α is high (i.e., the pixel in which the light transmission level is high) to thereby increase the light transmission level of the pixel P of the display section 44. The luminance information generating section 42 may output the thus-generated luminance information IR2, luminance information IG2, and luminance information IB2 as the picture signal Sdisp2.

In one embodiment of the invention, the display section 44 corresponds to the "first display section" without limitation. The display section 54 corresponds to the "second display section" in one embodiment of the invention without limitation.

[Operation and Workings]
[Detailed Operation]

The display unit 2 may perform the display, based on the signal Sin in which the picture signal Sdisp and the transmission picture signal Sa are multiplexed with each other. Upon performing the display, the display unit 2 may set the light transmission level of each of the pixels P in the display section 44 and the luminance of the white light of each of the pixels Q in the display section 54, both based on the pieces of transmission level information α. In the following, a description is given of a detailed operation of the display unit 2.

Figure 22A:
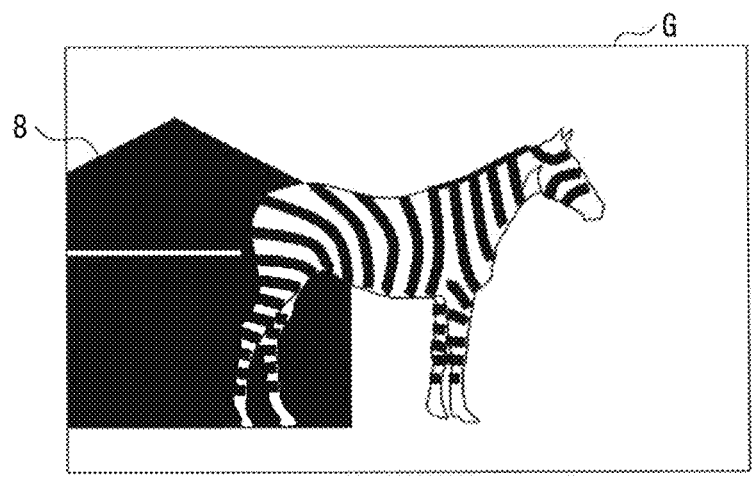
FIG. 22A describes an example of a viewed image according to a second example embodiment.

FIG. 22A illustrates an example of the viewed image G to be seen by the user 9 under a bright environment including daytime without limitation. Under the bright environment, the user 9 is able to see the zebra with respect to the part at which the zebra is located, i.e., the image part A, and is able to see the landscape located on the far side of the display unit 2 (in the example illustrated in FIG. 22A, the house 8 under the bright environment) with respect to the part that is other than the part at which the zebra is located, i.e., the part other than the image part A. In other words, the values of the respective pieces of transmission level information α are low (i.e., the light transmission levels are low) for the part at which the zebra is located, i.e., the image part A, in the display unit 2. Hence, for the image part A, the display section 44 may perform the display that is based on the luminance information IR2, the luminance information IG2, and the luminance information IB2 which are respectively equivalent to the luminance information IR, the luminance information IG, and the luminance information IB included in the picture signal Sdisp, whereas the display section 54 may increase the luminance of the white light in the image part A. As a result, the user 9 may see the image equivalent to the image represented by the picture signal Sdisp for the image part A. In contrast, the values of the respective pieces of transmission level information α are high (i.e., the light transmission levels are high) for the part that is other than the part at which the zebra is located, i.e., the part other than the image part A. Hence, the display section 44 and the display section 54 may increase the light transmission levels in the part other than the image part A. As a result, the user 9 may see the landscape located on the far side of the display unit 2 (in the example illustrated in FIG. 22A, the house 8 under the bright environment) for the part other than the image part A.

Figure 22B:
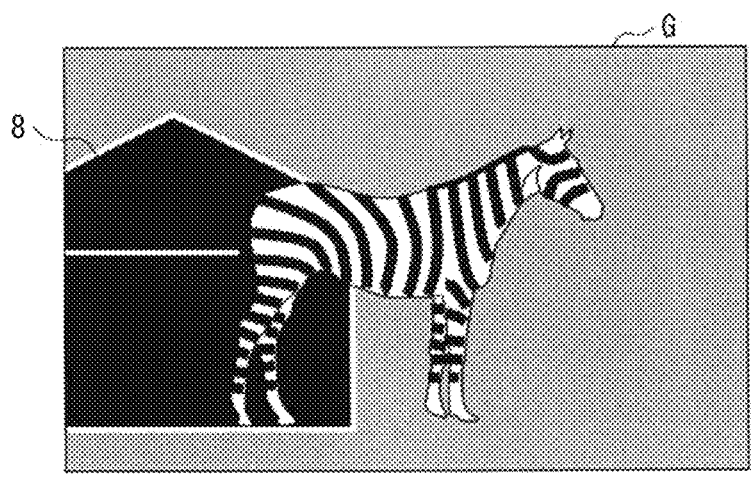
FIG. 22B describes another example of the viewed image according to the second example embodiment.

FIG. 22B illustrates an example of the viewed image G to be seen by the user 9 under a dark environment including the sunset without limitation. Under the dark environment, the user 9 is able to see the zebra with respect to the part at which the zebra is located, i.e., the image part A, and is able to see the landscape located on the far side of the display unit 2 (in the example illustrated in FIG. 22B, the house 8 under the dark environment) with respect to the part that is other than the part at which the zebra is located, i.e., the part other than the image part A. In other words, the values of the respective pieces of transmission level information α are low (i.e., the light transmission levels are low) for the part at which the zebra is located, i.e., the image part A, in the display unit 2. Hence, for the image part A, the display section 44 may perform the display that is based on the luminance information IR2, the luminance information IG2, and the luminance information IB2 which are respectively equivalent to the luminance information IR, the luminance information IG, and the luminance information IB included in the picture signal Sdisp, whereas the display section 54 may increase the luminance of the white light in the image part A. As a result, the user 9 may see the image equivalent to the image represented by the picture signal Sdisp for the image part A. In contrast, the values of the respective pieces of transmission level information α are high (i.e., the light transmission levels are high) for the part that is other than the part at which the zebra is located, i.e., the part other than the image part A. Hence, the display section 44 and the display section 54 may increase the light transmission levels in the part other than the image part A. As a result, the user 9 may see the landscape located on the far side of the display unit 2 (in the example illustrated in FIG. 22B, the house 8 under the dark environment) for the part other than the image part A.

According to the second example embodiment as described above, the display unit 2 may set the light transmission level of each of the pixels P in the display section 44 and the luminance of the white light of each of the pixels Q in the display section 54, both based on the pieces of transmission level information α, thereby making it possible for the user 9 to see the image equivalent to the image represented by the picture signal Sdisp for the image part A, and to see the landscape located on the far side of the display unit 2 for the part that is other than the image part A. Hence, it is possible to increase the visibility as compared with a comparative example to be described below.

[Comparative Example]

Referring to FIG. 6, the display unit 2R according to a comparative example includes the input section 11R, the drive section 13, and the display section 44. The display unit 2R according to the comparative example has a configuration in which the luminance information generating section 42, the drive section 23, and the display section 54 are removed from the display unit 2 according to the second example embodiment, and performs display only based on the picture signal Sdisp without using the transmission picture signal Sa.

Figure 23:
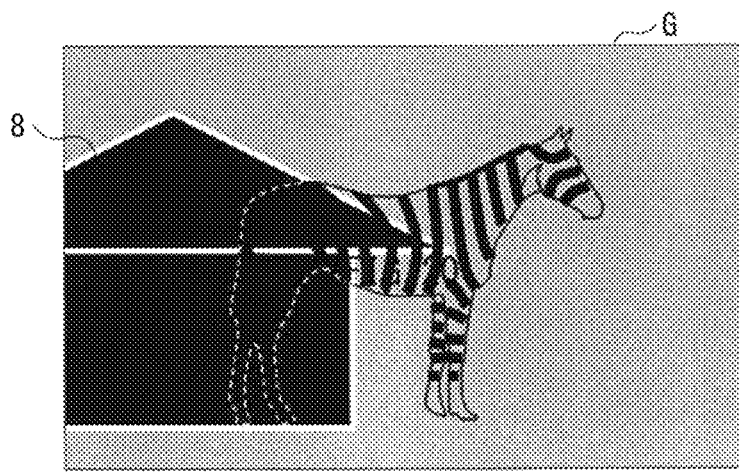
FIG. 23 describes an example of a viewed image according to a comparative example of the second example embodiment.

FIG. 23 illustrates an example of the viewed image G to be seen by the user 9 under the dark environment including the sunset without limitation. The display unit 2R performs the display, based on the luminance information IR, the luminance information IG, and the luminance information IB included in the picture signal Sdisp. Under such a circumstance, the values of the respective luminance information IR, luminance information IG, and luminance information IB are high in white parts in the frame image F (see FIG. 3), i.e., white parts in the stripe pattern of the zebra. Hence, the light transmission levels are high in those parts in the display section 44 which may be a device that allows for variable light transmission levels. As a result, the user 9 sees the landscape located on the far side of the display unit 2R (in the example illustrated in FIG. 23, the house 8 under the dark environment) for those parts. In contrast, the values of the respective luminance information IR, luminance information IG, and luminance information IB are low in black parts in the frame image F (see FIG. 3), i.e., black parts in the stripe pattern of the zebra and the part other than the zebra. Hence, the display section 44 displays a black color for those parts due to the low light transmission levels.

The comparative example may thus make it difficult for the user 9 to see the zebra with respect to, for example, a part of the zebra which is overlapped with the house 8 as illustrated in FIG. 23. In other words, in the part of the zebra which is overlapped with the house 8, the user 9 sees the black color resulting from the low light transmission levels in the display section 44 for the black parts in the stripe pattern of the zebra, whereas the user 9 sees the landscape located on the far side of the display unit 2R (i.e., the house 8) owing to transmission of light through the display section 44 for the white parts in the stripe pattern of the zebra. In the comparative example, the user 9 may find it difficult to see the zebra due to a small difference between the black color derived from the display performed by the display section 44 and the black color derived from the environment.

Further, the comparative example may make it difficult for the user 9 to see the zebra with respect to, for example, a part of the zebra which is not overlapped with the house 8 as well. In other words, in the part of the zebra which is not overlapped with the house 8, the user 9 sees the black color resulting from the low light transmission levels in the display section 44 for the black parts in the stripe pattern of the zebra, whereas the user 9 sees the landscape located on the far side of the display unit 2R (i.e., the landscape under the dark environment) owing to transmission of light through the display section 44 for the white parts in the stripe pattern of the zebra. In the comparative example, the user 9 may find it difficult to see the zebra due to a small difference between the black color derived from the display performed by the display section 44 and the black color derived from the environment under completely dark environment, for example.

In contrast, the display unit 2 according to the second example embodiment may set the light transmission level of each of the pixels P in the display section 44 and the luminance of the white light of each of the pixels Q in the display section 54, both based on the pieces of transmission level information α. Thus, in the display unit 2, the display section 44 may display the image that is equivalent to the image represented by the picture signal Sdisp whereas the display section 54 may increase the luminance of the white light, for the part at which the zebra is located (i.e., the image part A). For the part that is other than the part at which the zebra is located, the display section 44 and the display section 54 may increase the light transmission levels. Hence, it is possible for the user 9 to see the black and white stripe pattern of the zebra even under the dark environment such as the sunset as illustrated in FIG. 22B. Accordingly, it is possible for the display unit 2 to increase the visibility irrespective of a display content and an environment under which the display unit 2 is used as described above.

According to the foregoing second example embodiment, the light transmission level of each of the pixels P in the display section 44 and the luminance of the white light of each of the pixels Q in the display section 54 may be set based on the pieces of transmission level information α. Hence, it is possible to increase the visibility irrespective of a display content and an environment under which the display unit is used. Other effects achieved by the second example embodiment may be similar to the example effects achieved by the foregoing first example embodiment.

[Modification Example 2-1]

In the foregoing example embodiment, the pixels Q of the display section 54 each may emit light. However, embodiments of the invention are not limited thereto. In an alternative embodiment, each of the pixels Q may reflect light. More specifically, the pixels Q each may allow for a variable light reflection level in response to the value of the corresponding transmission level information α. In this case, each of the pixels Q may involve a lower light reflection level and may thus involve a higher light transmission level as the value of the transmission level information α becomes higher, and may involve a higher light reflection level as the value of the transmission level information α becomes lower. Such a device that allows for the variable light transmission level and the variable light reflection level may be, for example but not limited to, an electrochemical device in which electrochemical solution that contains silver ions is disposed between an indium tin oxide (ITO) film having a planar surface and an ITO film having a rough surface. The electrochemical device becomes like a mirror when the silver ions are electrodeposited on the planar-surfaced ITO film, and becomes transparent when the silver ions are made free from the electrodeposited state between the two ITO films. With this example configuration, the display unit according to this modification example may display an image equivalent to the image represented by the picture signal Sdisp for the image part A in a manner similar to a so-called reflective display unit. As a result, the user 9 may see the image equivalent to the image represented by the picture signal Sdisp for the image part A, and may see the landscape located on the far side of the display unit 2 for the part other than the image part A.

[Other Modification Examples]

The display unit 2 according to the second example embodiment, including the modification example thereof, may be combined with one or more of the modification examples according to the first example embodiment. Such combinations each may be considered as an example embodiment of the invention as well.

[3. Application Examples]

A description is given next of application examples of the display unit according to any one of the example embodiments and their modification examples described above.

Figure 24:
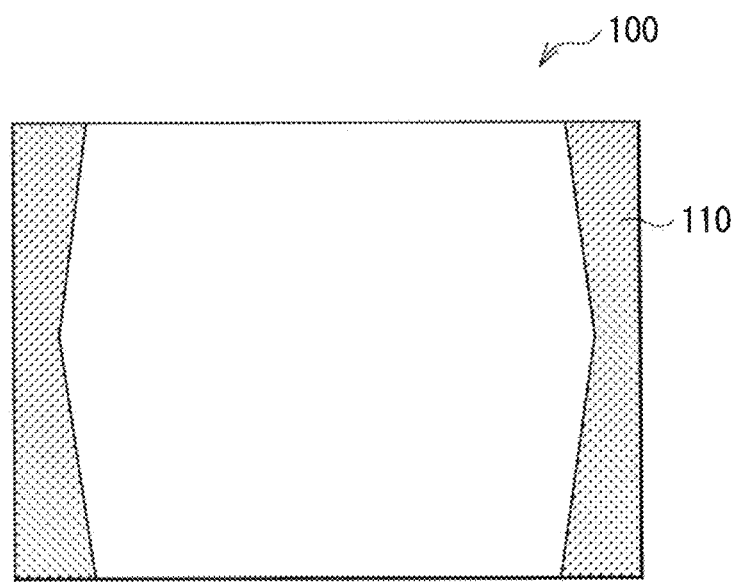
FIG. 24 describes an application example of the display unit according to any embodiment.

FIG. 24 illustrates an example of an operation of a television apparatus 100 to which the display unit according to any one of the example embodiments and the modification examples is applied. The television apparatus 100 may be configured as a window of a building. In this example, without limitation, the television apparatus 100 may include two display modes N1 and N2. In the following, an operation of each of the display modes N1 and N2 is described with reference to one example in which the display unit 1 is applied to the television apparatus 100.

In the display mode N1, the television apparatus 100 may display, for example but not limited to, a curtain 110 as illustrated in FIG. 24. The curtain 110 may be set as the image part A. For a part other than the curtain 110, i.e., the part other than the image part A, both the display section 14 and the display section 24 become transmissive. In other words, the television apparatus 100 may function as an ordinary window for the part other than the image part A.

In the display mode N2, the television apparatus 100 may display a broadcast picture. For example, the display section 14 may perform the display that is based on the luminance information IR2, the luminance information IG2, and the luminance information IB2 which are respectively equivalent to the luminance information IR, the luminance information IG, and the luminance information IB included in the broadcast picture signal Sdisp, whereas the display section 24 may set a screen of the display section 24 as a whole to be non-transmissive to perform the black display. In the display mode N2, it is thereby possible for the user 9 to see the image equivalent to the frame image F represented by the broadcast picture signal Sdisp (for example, the frame image F illustrated in FIG. 3) on the entire screen of the television apparatus 100.

Further, in one embodiment, the television apparatus 100 may be provided with a touch panel, allowing for opening and closing of the curtain 110 by sliding a finger while the finger is touched onto or brought close to the touch panel in the display mode N1. A color of the curtain 110 may be set to a darker color when the curtain 110 is closed. In this example manner, the television apparatus 100 according to an application example makes it possible to change shapes and colors of the curtain freely by a user's operation of the touch panel.

Further, the pixels in the part other than the curtain 110, i.e., the part other than the image part A, may emit light in the display mode N1 to provide a function as a lighting system in one embodiment. This makes it possible for a user to feel a dark, rainy day like a bright, sunny day, and to feel the sunset like the daytime.

The foregoing application example displays the curtain 110. However, application examples are not limited thereto. In an alternative application example, a blind, a window shade, a roll screen, or any other screen may be displayed. Further, in the foregoing application example, the television apparatus is configured as a window of a building. However, application examples are not limited thereto. In an alternative application example, the television apparatus may be configured as a window of a vehicle.

Figure 25:
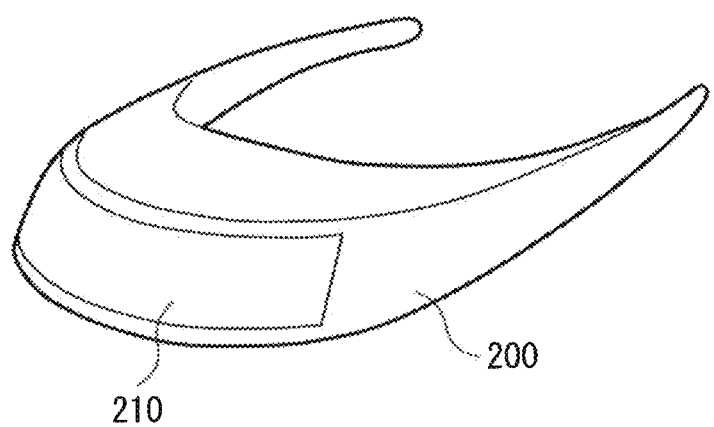
FIG. 25 describes another application example of the display unit according to any embodiment.

FIG. 25 illustrates an appearance of a head mounted display to which the display unit according to any one of the example embodiments and the modification examples is applied. The head mounted display according to an application example may include a body 200 and a display screen 210. The display screen 210 may include the display unit according to any one of the example embodiments and the modification examples described above.

The display unit according to any of the example embodiments and the modification examples is applicable to an electronic device in any field. Non-limiting examples of the electronic device may include a computer display, a video monitor, a home theater display, a flexible display, a commercial display, an industrial display, a head-up display, a clock, an electronic building display board, and a digital signage. In other words, the display unit according to any of the example embodiments and the modification examples is applicable to an electronic device that displays an image in any field.

Figure 26:
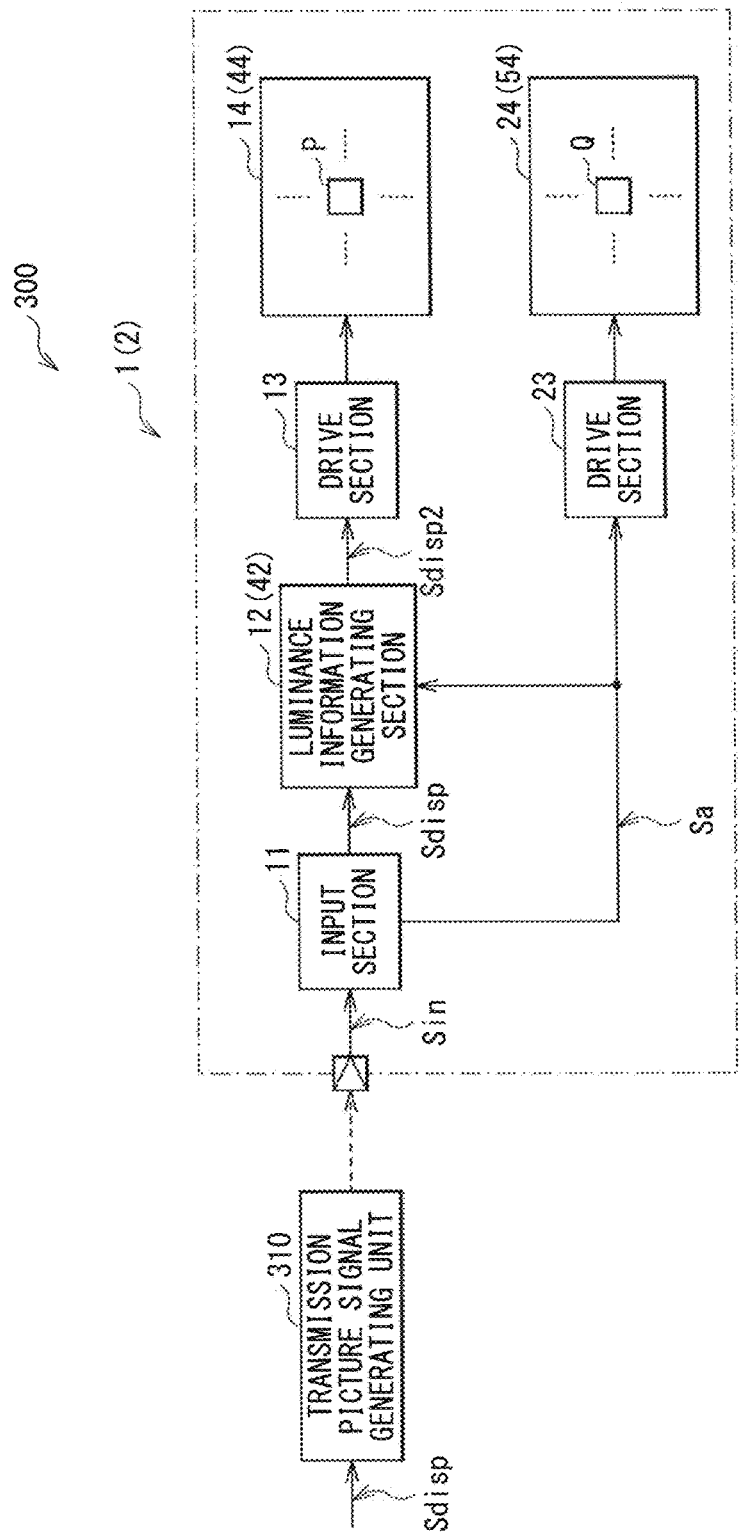
FIG. 26 describes another application example of the display unit according to any embodiment.

FIG. 26 illustrates an example of a configuration of a display system 300 to which the display unit according to any one of the example embodiments and the modification examples is applied. The display system 300 may include a transmission picture signal generating unit 310 and the display unit 1. The transmission picture signal generating unit 310 may generate the transmission picture signal Sa, based on the picture signal Sdisp. The transmission picture signal generating unit 310 may also generate the signal Sin, based on the picture signal Sdisp and the transmission picture signal Sa.

Although the invention has been described in the foregoing by way of example with reference to the embodiments and the modification examples, the invention is not limited thereto but may be modified in a wide variety of ways.

For example, the display unit 1 and any other display unit according to the example embodiments and the modification examples each may perform the display, based on the signal Sin in which the picture signal Sdisp and the transmission picture signal Sa are multiplexed with each other. In an alternative embodiment, the signal Sin may be recorded in a recording medium such as, but not limited to, a DVD (Registered Trademark) disc. In one embodiment where the display unit 1 or any other display unit is applied to a television apparatus, the signal Sin may be supplied through a broadcast wave.

As used herein, the term "sheet" may be used interchangeably with the term "plate".

Furthermore, the invention encompasses any possible combination of some or all of the various embodiments and the modifications described herein and incorporated herein.

It is possible to achieve at least the following configurations from the above-described example embodiments and the modification examples of the disclosure.

(1) A display unit, including:
a first display section configured to perform picture display and transmissive display, the picture display being based on a picture signal and performed on pixels in a partial region corresponding to a partial image part in a frame image represented by the picture signal, and the transmissive display being performed on pixels in a region other than the partial region; and
a second display section provided behind the first display section, and configured to perform dummy display and transmissive display, the dummy display being performed on pixels in the partial region to display a dummy image that is one of a uniform image and a non-uniform image, and the transmissive display being performed on pixels in the region other than the partial region.

(2) The display unit according to (1), wherein the first display section and the second display section each perform the transmissive display, based on a transmission picture signal that represents a pixel-based light transmission level.

(3) The display unit according to (2), wherein
the transmission picture signal includes the light transmission level in the partial region and the light transmission level in the region other than the partial region,
the first display section performs the picture display, based on the light transmission level in the partial region, and performs the transmissive display, based on the light transmission level in the region other than the partial region,
the second display section performs the dummy display, based on the light transmission level in the partial region, and performs the transmissive display, based on the light transmission level in the region other than the partial region, and
an average of the light transmission level represented by the transmission picture signal in the partial region is lower than an average of the light transmission level represented by the transmission picture signal in the region other than the partial region.

(4) The display unit according to (3), wherein the light transmission level is non-uniform in the region other than the partial region.

(5) The display unit according to (3), wherein the light transmission level is uniform in the region other than the partial region.

(6) The display unit according to any one of (3) to (5), further including a filter section configured to perform a filtering process on the transmission picture signal,
wherein the first display section and the second display section each perform the transmissive display, based on the transmission picture signal having been subjected to the filtering process.

(7) The display unit according to any one of (2) to (6), further including an input section configured to receive the picture signal and the transmission picture signal that are multiplexed with each other.

(8) The display unit according to any one of (2) to (6), further including:
a first input section configured to receive the picture signal; and
a second input section configured to receive the transmission picture signal.

(9) The display unit according to (8), wherein
the second input section includes a network interface, and
the transmission picture signal is supplied via the Internet.

(10) The display unit according to any one of (2) to (6), further including a transmission picture signal generating section configured to generate the transmission picture signal, based on the picture signal.

(11) The display unit according to any one of (1) to (10), wherein
the first display section includes a light-emission display section, and
the second display section includes a non-light-emission display section.

(12) The display unit according to any one of (1) to (10), wherein
the first display section includes a non-light-emission display section, and
the second display section includes a light-emission display section.

(13) The display unit according to any one of (1) to (10), wherein
the first display section includes a non-light-emission display section, and
the second display section includes a selective-reflection display section.

(14) The display unit according to any one of (1) to (13), wherein the first display section and the second display section are provided integrally.

(15) The display unit according to any one of (1) to (14), further including a third display section provided behind the second display section, and configured to perform picture display and transmissive display, the picture display being based on the picture signal and performed on pixels in the partial region, and the transmissive display being performed on pixels in the region other than the partial region.

(16) The display unit according to any one of (1) to (15), further including a perspective image separating section, wherein the first display section displays a plurality of perspective images, and
the perspective image separating section is configured to allow a user to view the perspective images separately.
(17) The display unit according to (16), wherein
the first display section space-divisionally displays the perspective images, and
the perspective image separating section includes one of a parallax barrier and a lenticular lens.
(18) The display unit according to any one of (1) to (15), further including a controller,
wherein the first display section time-divisionally displays the perspective images, and
the controller is configured to send a control signal to shutter eyeglasses having a left eye shutter and a right eye shutter, the left eye shutter and the right eye shutter each being operable to perform light transmission and light blocking in synchronization with display operation of the first display section.
(19) A display system with a transmission picture signal generating unit and a display unit, the transmission picture signal generating unit being configured to generate, based on a picture signal, a transmission picture signal that represents a light transmission level of each pixel, the display unit including:
a first display section configured to perform picture display and transmissive display, the picture display being based on the picture signal and performed on pixels in a partial region corresponding to a partial image part in a frame image represented by the picture signal, and the transmissive display being based on the transmission picture signal and performed on pixels in a region other than the partial region; and
a second display section provided behind the first display section, and configured to perform dummy display and transmissive display, the dummy display being performed on pixels in the partial region to display a dummy image that is one of a uniform image and a non-uniform image, and the transmissive display being based on the transmission picture signal and performed on pixels in the region other than the partial region.
(20) A display method, including:
generating, based on a picture signal, a transmission picture signal that represents a light transmission level of each pixel;
performing, in a first display section, picture display and transmissive display, the picture display being based on the picture signal and performed on pixels in a partial region corresponding to a partial image part in a frame image represented by the picture signal, and the transmissive display being based on the transmission picture signal and performed on pixels in a region other than the partial region; and
performing, in a second display section provided behind the first display section, dummy display and transmissive display, the dummy display being performed on pixels in the partial region to display a dummy image that is one of a uniform image and a non-uniform image, and the transmissive display being based on the transmission picture signal and performed on pixels in the region other than the partial region.

Although the invention has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:
1. A display unit, comprising:
a first display section configured to perform picture display and first transmissive display, the picture display being based on a picture signal and performed on pixels in a partial region corresponding to a partial image part in a frame image represented by the picture signal, and the first transmissive display being performed on pixels in a region other than the partial region; and
a second display section provided behind the first display section, and configured to perform dummy display and second transmissive display, the dummy display being performed on pixels in the partial region to display a dummy image that is one of a uniform image and a non-uniform image, and the second transmissive display being performed on pixels in the region other than the partial region, wherein
the first display section performs the first transmissive display, based on a transmission picture signal that represents a pixel-based light transmission level,
the second display section performs the second transmissive display, based on the transmission picture signal,
the transmission picture signal includes the light transmission level in the partial region and the light transmission level in the region other than the partial region,
the first display section performs the picture display, based on the light transmission level in the partial region, and performs the first transmissive display, based on the light transmission level in the region other than the partial region,
the second display section performs the dummy display, based on the light transmission level in the partial region, and performs the second transmissive display, based on the light transmission level in the region other than the partial region, and
an average of the light transmission level represented by the transmission picture signal in the partial region is lower than an average of the light transmission level represented by the transmission picture signal in the region other than the partial region.
2. The display unit according to claim 1, wherein the light transmission level is non-uniform in the region other than the partial region.

3. The display unit according to claim 1, wherein the light transmission level is uniform in the region other than the partial region.

4. The display unit according to claim 1, further comprising
a filter configured to perform a filtering process on the transmission picture signal, wherein
the first display section performs the first transmissive display, based on the transmission picture signal having been subjected to the filtering process, and
the second display section performs the second transmissive display, based on the transmission picture signal having been subjected to the filtering process.

5. The display unit according to claim 1, further comprising
an input configured to receive the picture signal and the transmission picture signal that are multiplexed with each other.

6. The display unit according to claim 1, further comprising:
a first input configured to receive the picture signal; and
a second input configured to receive the transmission picture signal.

7. The display unit according to claim 6, wherein the second input comprises a network interface, and the transmission picture signal is supplied via the Internet.

8. The display unit according to claim 1, further comprising
a transmission picture signal generator configured to generate the transmission picture signal, based on the picture signal.

9. The display unit according to claim 1, wherein the first display section comprises a light-emission display section, and the second display section comprises a non-light-emission display section.

10. The display unit according to claim 1, wherein the first display section comprises a non-light-emission display section, and the second display section comprises a light-emission display section.

11. The display unit according to claim 1, wherein the first display section comprises a non-light-emission display section, and the second display section comprises a selective-reflection display section.

12. The display unit according to claim 1, wherein the first display section and the second display section are provided integrally.

13. The display unit according to claim 1, further comprising
a third display section provided behind the second display section, and configured to perform picture display and third transmissive display, the picture display being based on the picture signal and performed on pixels in the partial region, and the third transmissive display being performed on pixels in the region other than the partial region.

14. The display unit according to claim 1, further comprising
a perspective image separator, wherein the first display section displays a plurality of perspective images, and the perspective image separator is configured to allow a user to view the perspective images separately.

15. The display unit according to claim 14, wherein the first display section space-divisionally displays the perspective images, and the perspective image separator comprises one of a parallax barrier and a lenticular lens.

16. The display unit according to claim 1, further comprising
a controller, wherein the first display section time-divisionally displays the perspective images, and the controller is configured to send a control signal to shutter eyeglasses having a left eye shutter and a right eye shutter, the left eye shutter and the right eye shutter each being operable to perform light transmission and light blocking in synchronization with display operation of the first display section.

17. A display system with a transmission picture signal generator and a display unit, the transmission picture signal generator being configured to generate, based on a picture signal, a transmission picture signal that represents a light transmission level of each pixel, the display unit comprising:
a first display section configured to perform picture display and first transmissive display, the picture display being based on the picture signal and performed on pixels in a partial region corresponding to a partial image part in a frame image represented by the picture signal, and the first transmissive display being based on the transmission picture signal and performed on pixels in a region other than the partial region; and
a second display section provided behind the first display section, and configured to perform dummy display and second transmissive display, the dummy display being performed on pixels in the partial region to display a dummy image that is one of a uniform image and a non-uniform image, and the second transmissive display being based on the transmission picture signal and performed on pixels in the region other than the partial region, wherein
the transmission picture signal includes the light transmission level in the partial region and the light transmission level in the region other than the partial region,
the first display section performs the picture display, based on the light transmission level in the partial region, and performs the first transmissive display, based on the light transmission level in the region other than the partial region,
the second display section performs the dummy display, based on the light transmission level in the partial region, and performs the second transmissive display, based on the light transmission level in the region other than the partial region, and
an average of the light transmission level represented by the transmission picture signal in the partial region is lower than an average of the light transmission level represented by the transmission picture signal in the region other than the partial region.

18. A display method, comprising:
generating, based on a picture signal, a transmission picture signal that represents a light transmission level of each pixel;
performing, in a first display section, picture display and first transmissive display, the picture display being based on the picture signal and performed on pixels in a partial region corresponding to a partial image part in a frame image represented by the picture signal, and the first transmissive display being based on the transmission picture signal and performed on pixels in a region other than the partial region; and
performing, in a second display section provided behind the first display section, dummy display and second transmissive display, the dummy display being performed on pixels in the partial region to display a dummy image that is one of a uniform image and a non-uniform image, and the second transmissive display being based on the transmission picture signal and performed on pixels in the region other than the partial region, wherein the transmission picture signal includes the light transmission level in the partial region and the light transmission level in the region other than the partial region, the picture display is performed based on the light transmission level in the partial region, the first transmissive display is performed based on the light transmission level in the region other than the partial region, the dummy display is performed based on the light transmission level in the partial region, the second transmissive display is performed based on the light transmission level in the region other than the partial region, and an average of the light transmission level represented by the transmission picture signal in the partial region is lower than an average of the light transmission level represented by the transmission picture signal in the region other than the partial region.

* * * * *